United States Patent [19]  [11] 4,357,674
Ikeda et al.  [45] Nov. 2, 1982

[54] PCM SIGNAL CALCULATOR

[75] Inventors: Yoshikazu Ikeda, Tama; Yasushi Wakahara, Yokohama, both of Japan

[73] Assignee: Kokusai Denshin Denwa Co., Ltd., Tokyo, Japan

[21] Appl. No.: 189,539

[22] Filed: Sep. 22, 1980

[30] Foreign Application Priority Data

Sep. 22, 1979 [JP] Japan .................. 54-121580
Jan. 21, 1980 [JP] Japan .................. 55-4524
Jan. 28, 1980 [JP] Japan .................. 55-7743
May 21, 1980 [JP] Japan .................. 55-66406

[51] Int. Cl.$^3$ .............................................. G06F 7/49
[52] U.S. Cl. ............................ 364/768; 364/754
[58] Field of Search ............ 364/754, 755, 756, 757, 364/768

[56] References Cited

U.S. PATENT DOCUMENTS 4,118,785 10/1978 Izumi et al. ................ 364/754
4,230,908 10/1980 Davis et al. ................ 364/768

OTHER PUBLICATIONS

Brubaker et al., "Multiplication Using Logarithms Implemented with ROM", *IEEE Trans. on Computers*, vol. C-24, No. 8, Aug. 1975, pp. 761-765.
"Error Reduction in ROM Multipliers", *Electronic Engineering*, vol. 49, No. 593, Jun. 1977, p. 17.
Waser, "High-Speed Monolithic Multipliers for Real-Time Digital Signal Processing", *Computer*, Oct. 1978, pp. 19-29.
Deard, "Addition of Two PCM Coded Voltages", *IBM Tech. Disclosure Bulletin*, vol. 18, No. 10, Mar. 1976, pp. 3309-3310.

*Primary Examiner*—David H. Malzahn
*Attorney, Agent, or Firm*—Allison C. Collard; Thomas M. Galgano

[57] ABSTRACT

A PCM signal calculator for non-linear encoded PCM signals in the A-law system or $\mu$-law system having a sign bit and a plurality of absolute value bits with three bits of segment number and four bits of step numbers within segment comprises; (a) a pair of input terminals for receiving the input PCM signals; (b) a signal or plurality of calculation means for providing the addition, subtraction and/or multiplication between the absolute values of two input PCM signals; (c) means for providing sign bit of the calculated result from the sign bits of the input PCM signals and/or the output of said calculation means; (d) an output terminal for providing the sign bit of the result from said means (c) and the absolute value of the result from said means (d). Said calculation means is either a table memory storing the result of each calculation according to the address designated by the input signals or combination of electronic components operating input PCM signals with segment number and step number within segment like a floating point number. Thus, the calculation of PCM signals encoded with non-linear encoding system like A-law and/or $\mu$-law is performed without converting the PCM signals to linear signals.

8 Claims, 22 Drawing Figures

PCM SIGNAL CALCULATOR

BACKGROUND OF THE INVENTION

The present invention relates to a system for performing the calculation between PCM signals which carry digital signals representing a voice signal and/or a picture signal.

A voice signal and/or a picture signal is sometimes treated in the form of a digital signal, for instance, a PCM signal which is the abbreviation of Pulse Code Modulation signal. Those signals are subject to calculations like an addition, a subtraction, a multiplication and/or a division, in the cases of measurement of electric power, the signal processing in an echo canceller, the signal processing in a digital filter, and/or the addition of two signals in a conference telephone service.

PCM signals have inevitably quantizing noise, since they are generated by quantizing analog signals. When a linear quantization is performed, the resultant quantizing noise is constant, irrespective of the amplitude of the signal. However when the signal to be quantized is a voice signal, a non-linear quantization in which the quantization in which the quantizing step depends upon the amplitude of an analog signal is performed so that the quantizing noise is the smallest in the given number of bits of the digital signal.

Conventionally, when the calculation of that non-linear PCM signal is performed, the non-linear PCM signal is first converted to a linear PCM signal, and then, the calculation is performed for the converted linear PCM signals providing the linear result, and finally, that linear result is reconverted to a non-linear PCM signal.

However, that prior art has the disadvantages that the calculator must be large and the calculation speed is slow since the calculator must perform the conversion and reconversion between a non-linear PCM signal and a linear PCM signal, and generally speaking a linear PCM signal has more bit positions than that of a non-linear PCM signal.

SUMMARY OF THE INVENTION

It is an object, therefore, of the present invention to overcome the disadvantages and limitations of a prior PCM signal calculator by providing a new and improved PCM signal calculator.

It is also an object of the present invention to provide a PCM signal calculator which performs the calculation by looking up a digital memory table.

It is also an object of the present invention to provide a PCM signal calculator which performs the calculation of a PCM signal by separating that PCM signal into a segment number and a step number within a segment, which are calculated separately.

The above and other objects are attained by a PCM signal calculator for input PCM signals P and Q each having a sign bit and a plurality of absolute value bits encoded to non-linear encoding system selected from A-law encoding system and $\mu$-law encoding system with three bits of segment number and four bits of step number within segment comprising (a) a pair of input terminals for receiving the input PCM signals P and Q; (b) calculation means for performing the addition, subtraction and/or multiplication of the absolute values of the input PCM signals; (c) means for providing the sign bit of the calculation from the sign bits of the input PCM signals and/or the output of said calculation means; and (d) output terminal for providing the absolute value from said calculation means and the sign bit from said means (c).

According to one embodiment of the present invention, said calculation means is implemented by a table memory which stores the result of the calculation at the address indicated by the input signals, and said table memory is preferably a read-only-memory.

According to another embodiment of the present invention, said calculation means is implemented by combination of electronic elements which separates each of the input PCM signals to segment number and step number within segment, and performs the calculation of the segment numbers and the step numbers within segments separately, and then, the resultant segment number is revised according to the resultant step number within segment.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

In order to simplify the explanation, it is assumed that a PCM signal has 8 bits including a sign bit.

Figure 1:
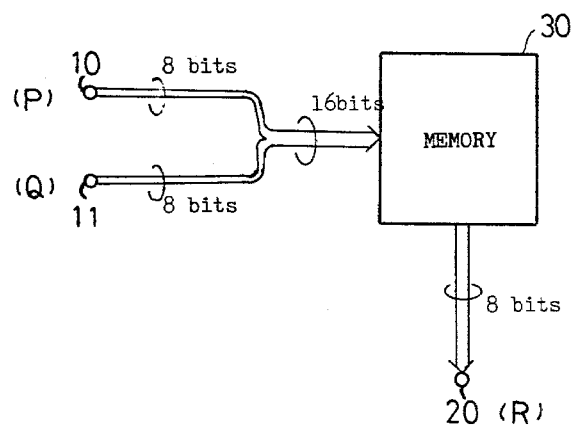
FIG. 1 is the general brief block diagram of the present PCM signal calculator.

FIG. 1 is the general brief block diagram of the present PCM signal calculator, in which the reference numerals 10 and 11 are input terminals of the PCM signals to be calculated, 20 is an output terminal for providing the resultant calculated PCM signal, and 30 is a digital memory table. The input signals at the input terminals 10 and 11 designate the address of the digital memory 30, which stores the calculated result of the calculation between two input signals, and the read-out signal is provided to the output terminal 20. For instance, assuming that the first input signal at the first input terminal 10 is (00000011) and the second input signal at the second input terminal 11 is (00000101), then, those two input signals designate the address (00000011, 00000101) of the memory 30, and that memory 30 stores the value (00001110) in that address in case of multiplication. Thus, the multiplication ($3 \times 5 = 15$) has been performed by looking up the digital memory table. The above example shows the linear calculation for the sake of the simplicity of the explanation, although PCM signals are usually in a non-linear form. In case of non-linear form, for example, when two input signals P and Q are P=01010000, and Q=00011111, then, the product $P \times Q$ is $P \times Q = 0000100$. That memory 30 stores the calculated result for all the combination of the input signals. Therefore, the calculation is carried out in general by looking up that table. The memory 30 is implemented therefore by a read-only-memory. Although FIG. 1 shows the case that there are two input signals, it should be appreciated that more than three input signals to be calculated at the same time are, of course possible.

Figure 2:
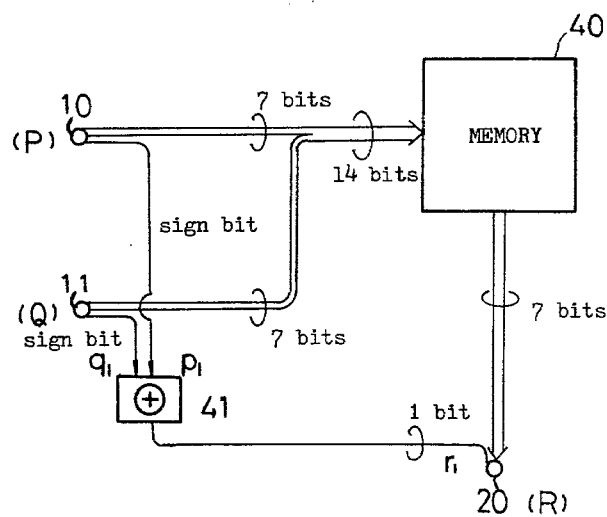
FIG. 2 is a block diagram of another embodiment of the present PCM signal calculator.

FIG. 2 is a block diagram of another embodiment of the present PCM signal calculator, which performs a multiplication and/or division. In FIG. 2, the reference numerals 10 and 11 are input terminals, 20 is an output terminal, 40 is a digital memory, and 41 is an exclusive-OR circuit for calculating the sign bit separately. In the embodiment of FIG. 2, the capacity of the memory 40 can be small compared with that of FIG. 1, since the sign bit is calculated separately by the exclusive-OR circuit 41.

It is assumed that two input signals P, and Q, and the output signal R have 8 bits, and are expressed as follows.

$$P = p_1 p_2 p_3 p_4 p_5 p_6 p_7 p_8$$

$$Q = q_1 q_2 q_3 q_4 q_5 q_6 q_7 q_8$$

and $$R = r_1 r_2 r_3 r_4 r_5 r_6 r_7 r_8$$

where the first bits $p_1$, $q_1$ and $r_1$ are sign bits indicating positive (+) or negative (−), and other bits designate the absolute value. The result $r_1$ which is the sign bit, and $|R| = r_2 r_3 r_4 r_5 r_6 r_7 r_8$ which is the absolute value of the calculated result are shown in the table 1 according to the operations.

TABLE 1

| | Operation | | |
|---|---|---|---|
| Result | Multiplication or Division | Addition | Subtraction |
| $r_1$ when $p_1 = q_1$ | + | $p_1$ | sign bit of $\|P\| - \|Q\|$ ... when $p_1 = 0$ Inversion of sign bit of $\|P\| - \|Q\|$ ... when $p_1 = 1$ |
| when $p_1 \neq q_1$ | − | sign bit of $\|P\| - \|Q\|$ ... when $p_1 = 0$ Inversion of sign bit of $\|P\| - \|Q\|$ ... when $p_1 = 1$ | $p_1$ |
| R when $p_1 = q_1$ | $\|P\| \cdot \|Q\|$ or $P/Q$ | $\|P\| + \|Q\|$ | $\|\|P\| - \|Q\|\|$ |
| when $p_1 \neq q_1$ | $\|P\| \cdot \|Q\|$ or $P/Q$ | $\|\|P\| - \|Q\|\|$ | $\|P\| + \|Q\|$ |

In case of multiplication or division, the sign bit $r_1$ of the product or quotient is determined only by the sign bits $p_1$ and $q_1$ of the input signals, and the absolute value $|R| = r_2 r_3 r_4 r_5 r_6 r_7 r_8$ of the product or quotient is always the product or the quotient of the absolute values $|P| = p_2 p_3 p_4 p_5 p_6 p_7 p_8$ and $|Q| = q_2 q_3 q_4 q_5 q_6 q_7 q_8$ of two input signals. Accordingly, the sign bit $r_1$ can be obtained by an exclusive-OR circuit, and the absolute value $|R|$ is obtained by using a digital memory table 40 which has less capacity compared with that of FIG. 1 since a sign bit is processed separately. When each of input signals has 8 bits, the capacity of the memory 40 is $2^{2(8-1)}$ words each of which has $(8-1)$ bits, while capacity of the memory 30 of FIG. 1 is $2^{2 \times 8}$ words each of which has 8 bits. Therefore, the word length of the memory 40 is reduced to 7 bits from 8 bits, and the number of words (capacity) of the memory 40 is reduced to ¼ as compared with the memory 30 of FIG. 1 by processing a sign bit separately.

In FIG. 2, the sign bits $p_1$ and $q_1$ of input signals are processed by the exclusive-OR circuit 41, which provides the sign bit $r_1$ of the multiplication or division, and the absolute value $|R|$ of multiplication or division between two input signals are obtained by looking up the digital memory table 40, the address of which is designated by the absolute values of two input signals.

Next, the addition for PCM signals is described. In this case two digital memories storing the sum $|P| + |Q|$ and the difference $|P| - |Q|$ are utilized. The latter memory stores not only the absolute value but also the sign bit of the difference. Therefore, the capacity of the first memory for $|P| + |Q|$ is $2^{2(n-1)}$ words each having $(n-1)$ bits, and capacity of the second memory for $|P|-|Q|$ is $2^{2(n-1)}$ words each having n bits, where n is the number of bits of each input PCM signal and n=8 in this embodiment. As apparent from the table 1, when the sign bit $p_1$ is equal to the sign bit $q_1$, the sign bit $r_1$ of the sum is equal to $p_1$ and $q_1$, and the absolute value of the sum is obtained by the output of the first memory for $|P|+|Q|$. On the other hand, when the sign bit $p_1$ of the first PCM input signal is different from the sign bit $q_1$ of the second PCM input signal, the absolute value of the sum is obtained from the absolute value of the second memory for $|P|-|Q|$, and the sign of the sum is either the sign bit of the output of the second memory when $p_1$ positive, or the reversed sign of the sign bit of the output of the second memory when $p_1$ is negative.

Figure 3:
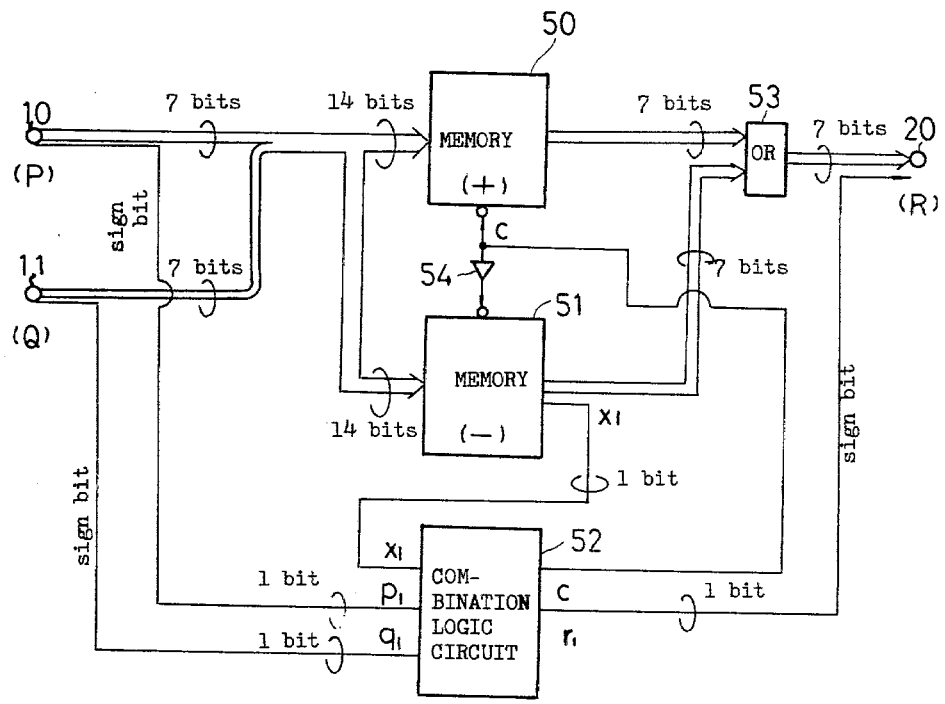
FIG. 3 is a block diagram of an adder for PCM signals.

FIG. 3 is the block diagram of an adder for PCM signals for performing the above operation. In FIG. 3, the reference numerals 10 and 11 are input terminals of PCM signals to be calculated, 20 is an output terminal of the resultant sum, 50 is a digital memory storing $|P|+|Q|$ excluding a sign bit, 51 is a second digital memory storing $|P|-|Q|$ including a sign bit, 52 is a combination logic circuit which provides the outputs $r_1$ and c from the inputs $x_1$, $p_1$ and $q_1$ according to the truth table shown in the table 2, 53 is an OR-circuit, and 54 is an inverter.

TABLE 2

| $x_1$ | $p_1$ | $q_1$ | $r_1$ | c |
|---|---|---|---|---|
| 0 | 0 | 0 | 0 | 0 |
| 0 | 0 | 1 | 0 | 1 |
| 0 | 1 | 0 | 1 | 1 |
| 0 | 1 | 1 | 1 | 0 |
| 1 | 0 | 0 | 0 | 0 |
| 1 | 0 | 1 | 1 | 1 |
| 1 | 1 | 0 | 0 | 1 |
| 1 | 1 | 1 | 1 | 0 |

The operation of the apparatus of FIG. 3 is as follows. The absolute values of the input PCM signals are applied to the memories 50 and 51 as the address information of those memories. Those memories 50 and 51 have control terminals (c) and it is supposed that the first memory 50 is active when the control signal (c)=0, and the second memory 51 is active when the control signal (c)=1. The control signal (c) is (c)=0 when $p_1=q_1$, or (c)=1 when $p_1 \neq q_1$, that is to say, when $p_1=q_1$ the first memory 50 is read out to provide $|P|+|Q|$, and when $p_1 \neq q_1$, the second memory 51 is read out to provide $|P|-|Q|$ together with the sign bit of the sum. The outputs of the memories 50 and 51 are applied to the output terminal 53 through the OR-circuit 53 as the absolute value portion of the sum. On the other hand, the sign bit $r_1$ of the sum is $r_1=p_1$ when $p_1=q_1$ is satisfied, or $p_1=x_1$ when $p_1 \neq q_1$ and $p_1=0$ (positive) are satisfied, or $p_1=\bar{x}_1$ when $p_1 \neq q_1$ and $p_1=1$ (negative) as shown in the table 2.

In case of subtraction, only the inversion of the sign of the second PCM input signal at the input terminal 11 in FIG. 3 is enough.

Figure 4:
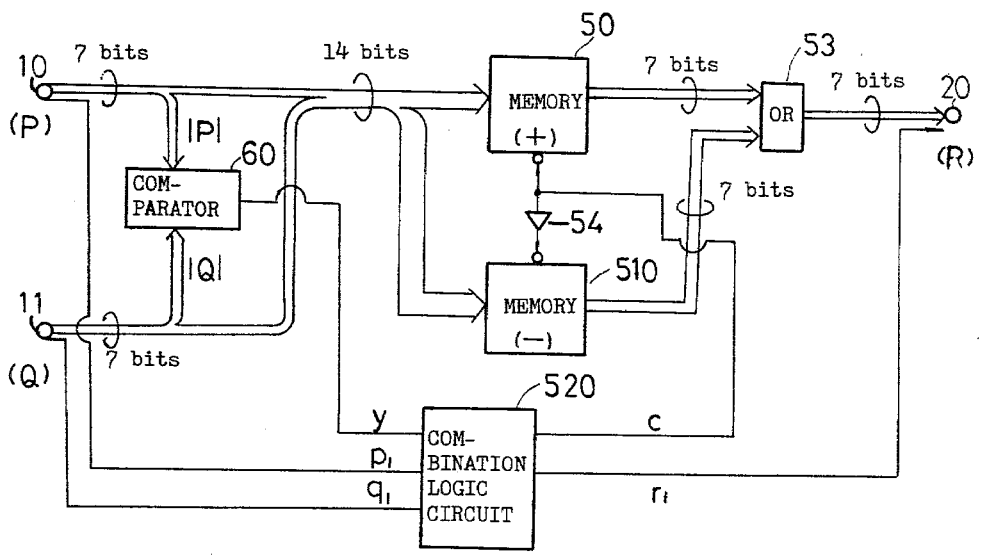
FIG. 4 shows the alternative of the embodiment of FIG. 3.

FIG. 4 is the modification of the apparatus of FIG. 3, and the feature of the apparatus of FIG. 4 is that the memories do not include the sign bit although the second memory 51 of FIG. 3 includes the sign bit. Thus, the capacity of the second memory is decreased. In FIG. 4, the second memory 510 stores $|P|-|Q|$ excluding the sign bit, and the comparator 60 is introduced. The combination logic circuit 520 performs the truth table as shown in the table 3.

TABLE 3

| y | $p_1$ | $q_1$ | $r_1$ | c |
|---|---|---|---|---|
| 0 | 0 | 0 | 0 | 0 |
| 0 | 0 | 1 | 0 | 1 |
| 0 | 1 | 0 | 1 | 1 |
| 0 | 1 | 1 | 1 | 0 |
| 1 | 0 | 0 | 0 | 0 |
| 1 | 0 | 1 | 1 | 1 |
| 1 | 1 | 0 | 0 | 1 |
| 1 | 1 | 1 | 1 | 0 |

The absolute value of the sum in the apparatus in FIG. 4 is obtained in the same manner as that of FIG. 3. The sign bit $r_1$ of the sum in the apparatus in FIG. 4 obtained as follows taking into consideration the output of the comparator 60 which compares the absolute values of the input PCM signals with each other. The sign bit $r_1$ is $r_1=p_1$ when $p_1=q_1$ is satisfied, or $r_1=p_1$ when $p_1 \neq q_1$ and y=0 (which means $|P| \geq |Q|$) are satisfied, or $r_1=\bar{p}_1$ when $p_1=q_1$ and y=1 (which means $|P|<|Q|$) are satisfied. Thus, by introducing the comparator 60, the capacity of the second memory is reduced, and said capacity of the second memory is $2^{2(n-1)}$ words each having (n−1) bits, where n is the number of bits of PCM signal.

Since the memories of the present invention are merely read out in operation, those memories are implemented by a read-only-memory, and all the circuits in each figure can be implemented on a single integrated circuit. Further, if the circuits of FIGS. 2 and 3, or the circuits of FIGS. 2 and 4 are mounted on a single integrated circuit, the apparatus can perform all the necessary addition, subtraction, multiplication and division.

Next, other embodiments of the present invention are described. The typical PCM coding systems are recommended by the International Telegraph & Telephone Consultative Committee (CCITT) which is one of the subsidiary organizations of the United Nations. They are the A-law coding system and the μ-law coding system both of which have 8 non-linear bits. The table 4 shows the A-law coding system with the related linear signal excluding a sign bit, and the table 5 shows the μ-law coding system with the related linear signal excluding a sign bit.

TABLE 4

| A-law coding system recommended by CCITT | | | | | | | | | | | | | | | | | | | |
|---|---|---|---|---|---|---|---|---|---|---|---|---|---|---|---|---|---|---|---|
| PCM (NON-LINEAR SIGNAL) | | | | | | | | LINEAR SIGNAL | | | | | | | | | | | |
| SEGMENT | $A_1$ | $A_2$ | $A_3$ | $A_4$ | $A_5$ | $A_6$ | $A_7$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ |
| 7 | 1 | 1 | 1 | w | x | y | z | 1 | w | x | y | z | 1 | 0 | 0 | 0 | 0 | 0 | 0 |
| 6 | 1 | 1 | 0 | w | x | y | z | 0 | 1 | w | x | y | z | 1 | 0 | 0 | 0 | 0 | 0 |
| 5 | 1 | 0 | 1 | w | x | y | z | 0 | 0 | 1 | w | x | y | z | 1 | 0 | 0 | 0 | 0 |
| 4 | 1 | 0 | 0 | w | x | y | z | 0 | 0 | 0 | 1 | w | x | y | z | 1 | 0 | 0 | 0 |
| 3 | 0 | 1 | 1 | w | x | y | z | 0 | 0 | 0 | 0 | 1 | w | x | y | z | 1 | 0 | 0 |
| 2 | 0 | 1 | 0 | w | x | y | z | 0 | 0 | 0 | 0 | 0 | 1 | w | x | y | z | 1 | 0 |
| 1 | 0 | 0 | 1 | w | x | y | z | 0 | 0 | 0 | 0 | 0 | 0 | 1 | w | x | y | z | 1 |

TABLE 4-continued

A-law coding system recommended by CCITT

| | PCM (NON-LINEAR SIGNAL) | | | | | | | LINEAR SIGNAL | | | | | | | | | | | |
|---|---|---|---|---|---|---|---|---|---|---|---|---|---|---|---|---|---|---|---|
| SEGMENT | $A_1$ | $A_2$ | $A_3$ | $A_4$ | $A_5$ | $A_6$ | $A_7$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ |
| 0 | 0 | 0 | 0 | w | x | y | z | 0 | 0 | 0 | 0 | 0 | 0 | 0 | w | x | y | z | 1 |

TABLE 5

μ-law coding system recommended by CCITT

| | PCM (NON-LINEAR SIGNAL) | | | | | | | LINEAR SIGNAL AFTER ADDED by $33/2^{13}$ | | | | | | | | | | | | |
|---|---|---|---|---|---|---|---|---|---|---|---|---|---|---|---|---|---|---|---|---|
| SEGMENT | $A_1$ | $A_2$ | $A_3$ | $A_4$ | $A_5$ | $A_6$ | $A_7$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ |
| 7 | 1 | 1 | 1 | w | x | y | z | 1 | w | x | y | z | 1 | 0 | 0 | 0 | 0 | 0 | 0 | 0 |
| 6 | 1 | 1 | 0 | w | x | y | z | 0 | 1 | w | x | y | z | 1 | 0 | 0 | 0 | 0 | 0 | 0 |
| 5 | 1 | 0 | 1 | w | x | y | z | 0 | 0 | 1 | w | x | y | z | 1 | 0 | 0 | 0 | 0 | 0 |
| 4 | 1 | 0 | 0 | w | x | y | z | 0 | 0 | 0 | 1 | w | x | y | z | 1 | 0 | 0 | 0 | 0 |
| 3 | 0 | 1 | 1 | w | x | y | z | 0 | 0 | 0 | 0 | 1 | w | x | y | z | 1 | 0 | 0 | 0 |
| 2 | 0 | 1 | 0 | w | x | y | z | 0 | 0 | 0 | 0 | 0 | 1 | w | x | y | z | 1 | 0 | 0 |
| 1 | 0 | 0 | 1 | w | x | y | z | 0 | 0 | 0 | 0 | 0 | 0 | 1 | w | x | y | z | 1 | 0 |
| 0 | 0 | 0 | 0 | w | x | y | z | 0 | 0 | 0 | 0 | 0 | 0 | 0 | 1 | w | x | y | z | 1 |

First, the multiplication for the PCM signal encoded by the A-law system is described. When a multiplicand has (m) bits and a multiplier has (n) bits, a product has in general (m+n) bits. Therefore, in a multiplication of PCM signals, the less significant bits of the product are rounded or cancelled to provide the 8-bits of product. It is assumed that two PCM signals P and Q to be multiplicated with each other are shown as follows excluding sign bits.

$P = 1010000$ $Q = 0011111$

Then, the linear numbers P' and Q' corresponding to those non-linear PCM signals P and Q are obtained from the No. 5 and No. 1 of the table 4 as follows.

$P' = 001000010000$     (12 bits)

$Q' = 000000111111$     (12 bits)

The product R' of the P' and Q' is calculated as follows.

```
P'    001000010000
Q'    000000111111
         1000010000
        1000010000
       1000010000
      1000010000
     1000010000
    1000010000
  000000001000000111110000
           Round off
```

Although the product has 24 bits in a linear representation, the less significant 12 bits are rounded off, and thus, the product R' has 12 bits at the right half portion as follows.

$R' = 000000001000$

The non-linear PCM signal R corresponding to R' is obtained from the segment No. 0 of the table 4 as follows.

$R = 0000100$ where w=y=z=0, x=1, and $b_{12}(=1)$ is neglected in view of the round off. That multiplication is understood as a PCM signal is normalized in the range between 0 and 1.

A division can be performed in a similar manner, and when a divisor is larger than a dividend, and an overflow occurs, the overflow indication is necessary.

In the table 4, when a non-linear PCM signal P is $P = P_0 P_1 P_2 P_3 P_4 P_5 P_6 P_7$ where $P_i(i=0-7)$, $P_0$ is a sign bit, $p_1$ through $p_3$ are segment numbers, and $p_4$ through $P_7$ are step number within a segment, and the linear expression of that P has 12 bits (excluding a sign bit) as shown below.

$$\underbrace{00\ldots01}_{x} P_4 P_5 P_6 P_7 \underbrace{10\ldots0}_{y}$$

where x number of 0's and y number of 0's exist at the extreme left portion and the extreme right portion, respectively.

The values x and y are expressed as follows where $[P_1P_2P_3]$ is a segment number.

$$\left. \begin{array}{l} x = 7 - [P_1P_2P_3] \\ y = 6 - x \end{array} \right\}$$

for segment number 1 through 7, and the segment number 0 is expressed as follows.

$\underbrace{0000000}_{\text{7 0's}} P\ P_4 P_5 P_6 P_7 1$

Accordingly, it should be appreciated that a linear expression has many 0's, and therefore, it is enough to perform a multiplication for the portions which are not zero. That is to say, a multiplication has only to be performed for $1P_4P_5P_6P_71$ or $P_4P_5P_6P_71$ The former is for the segments No. 1 through No. 7 excluding x+y (=6) number of 0's, and the latter is for the segment No. 0. Those portions $1P_4P_5P_6P_7$ or $P_4P_5P_6P_71$ are called step numbers, and the portion $p_1p_2p_3$ are called segement numbers. The combination of the segment number and the step number within segment correspond to the integer part and the fraction part of a floating point number, respectively.

Therefore, according to the present invention, in multiplicating two PCM signals, the multiplication between two step numbers, and the addition between two segment numbers are performed, thus, no conversion from a non-linear PCM signal to a linear signal is necessary.

Figure 5:
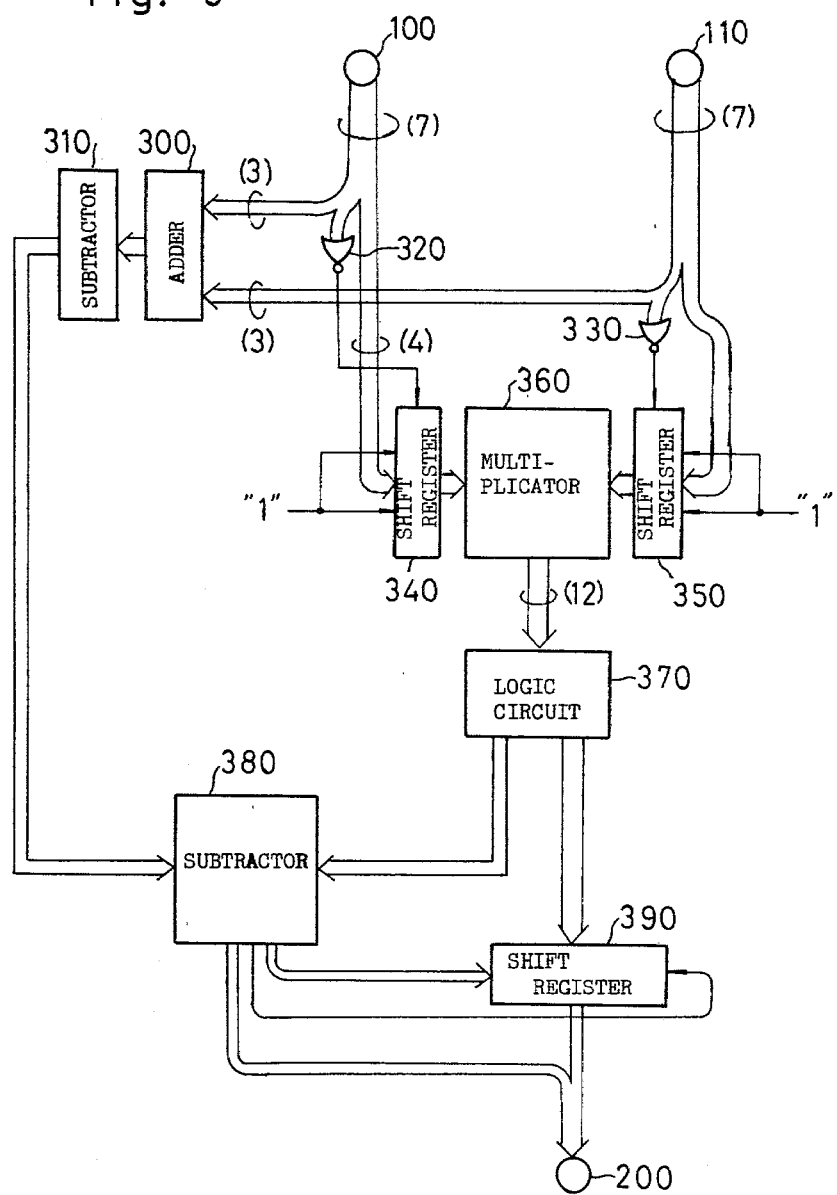
FIG. 5 is a block diagram of a multiplicator for PCM signals encoded by A-law system.

FIG. 5 shows a block diagram of a multiplicator for PCM signals encoded by A-law system. In FIG. 5, the reference numerals 100 and 110 are input terminals which receive absolute values (each having 7 bits) of PCM signals to be multiplicated, 200 is an output terminal for providing the absolute value of the product, 300 is an adder for performing the addition of the segment numbers ($P_1P_2P_3$) of the input PCM signals, 310 is a subtractor for subtracting the fixed number 7 from the sum provided by the adder 300, 320 and 330 are NOR circuits which provide the output signal only when the segment No. 0 is applied to the input terminals 100 and 110, respectively. The reference numeral 340 and 350 are shift registers each having 6 bit positions, the extreme ends of two bits of which have the value "1", and the central four bits of which have the step value within segment of the PCM signals, and the contents of those shift registers are shifted by one bit in the left direction when the NOR circuits 320 and 330 provide the outputs, respectively, and "0" is inserted in the least significant bit position after said shift operation. The reference numeral 360 is a multiplicator for performing the multiplication of 6-bits number and 6-bits number from the shift registers, 370 is a logic circuit which applies the number of 0's at the left portion in the product of the multiplicator to the subtractor 380, and applies the rest bits of the product to the shift register 390. The reference numeral 380 is a subtractor which subtracts the output of the logic circuit 370 from the output of the subtractor 310. When the difference of the output of the subtractor 380 is zero or negative, the absolute number of that difference is applied to the shift register 390 to shift the contents of the same in the right direction by the same bit positions as that absolute number, and the segment number "0" is applied to the output terminal 200, and when said difference of the output of the subtractor 380 is positive, the absolute number of the difference is applied to the output terminal 200 and the control signal is applied to the shift register 390 to shift the contents of the same in the left direction by one bit position. The reference numeral 390 is a two direction shift register which receives the output of the logic circuit 370 and shifts the same according to the output signal of the subtractor 380.

The operation of the apparatus of FIG. 5 is as follows.

As described before, in multiplicating PCM signals, the calculations of the segment numbers and the step numbers in segment are performed separately. The adder 300 performs the addition of two segment numbers of the two PCM signals, and the fixed number (7) is subtracted from the sum of that addition in the adder 300 by the subtractor 310. The segment number of the product is provisionally obtained by the difference from the subtractor 310, although that segment number of the product is subject to be normalized in another subtractor 380.

The step number in a segment of the product is obtained utilizing the shift registers 340, 350, and the multiplicator 360. The shift registers 340 and 350 receive the step number is segment ($P_4$, $P_5$, $P_6$, $P_7$) of each PCM signals, and a pair of fixed number 1's, then, the fraction portion of a PCM signal excluding 0's at both the extreme ends in the linear expression of a PCM signal is obtained as follows.

$$1P_4P_5P_6P_71$$

When the segment number is 0, the contents of the shift registers 340 and 350 are shifted by one bit in the left direction by the control signal from the NOR circuits 320, 330, respectively, and said fraction portion is as follows.

$$P_4P_5P_6P_710$$

Thus, it should be noted that the above expressions coincide with the table 4.

Next, the multiplication 360 multiplies the contents of the shift register 340 to the contents of the shift register 350, and the product of that multiplication is applied to the logic circuit 370. Thus, the segment number of the product is obtained at the output of the subtractor 310, and the step number within segment of the product is obtained at the output of the multiplicator 360. Those outputs are normalized or converted to the standard format shown in the table 4. The logic circuit 370 receives the product from the multiplicator 360, or the fraction part, and counts the number of continuous 0's at the significant bit positions, and the counted number is applied to the subtractor 380, which subtracts that counted number from the output of the subtractor 310 to provide the normalized segment number of the product.

When the difference from the subtractor 380 is positive, the output of that subtractor 380 is the final value of the segment number of the product, and the shift register 390 provides four bits as the step number in a segment by removing the continuous 0's in the significant bit positions and next 1 succeeding to those 0's. Those segment numbers and the step number in a segment of the product are provided at the output terminal 200.

When the difference from the subtractor 380 is zero, the resultant segment number of the product is also zero, and the step number in a segment is the four bits from the left in the output of the logic circuit 370.

When the difference from the subtractor 380 is negative, the segment number of the product is zero, and the step number in a segment is obtained by shifting the content of the shift register 390 by that number from the subtractor 380 in the right direction.

Figure 6:
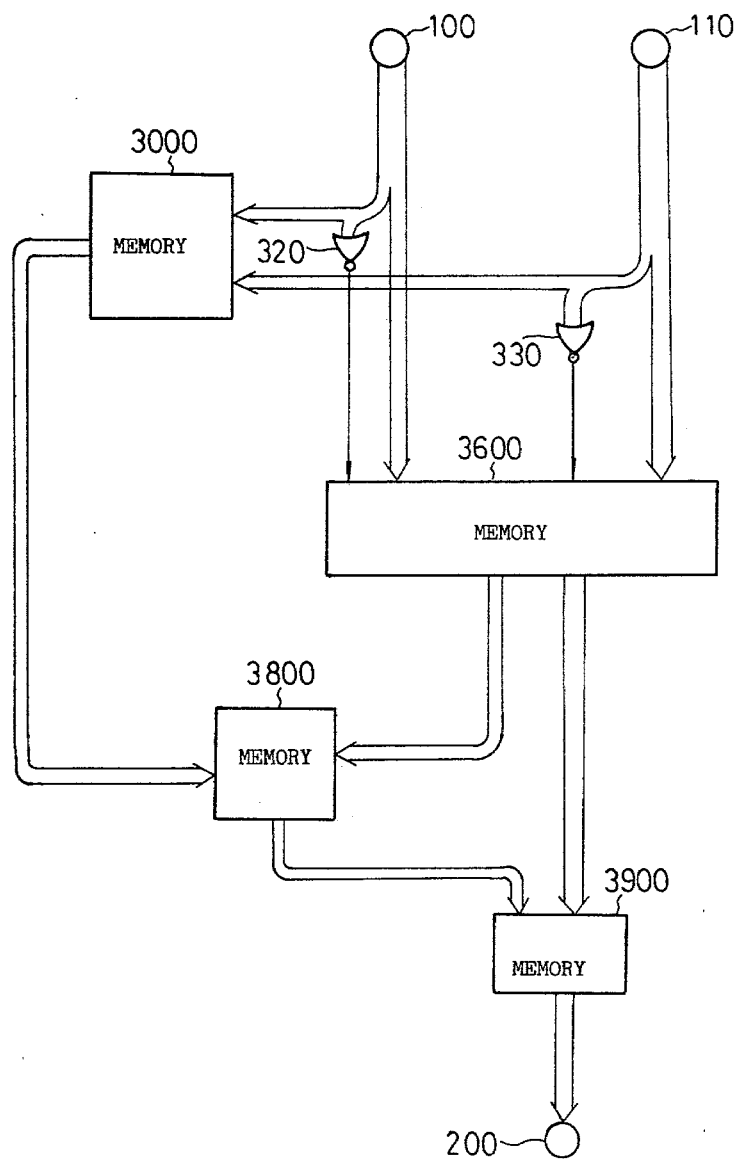
FIG. 6 is the modification of the embodiment of FIG. 5.

FIG. 6 is the modification of the embodiment of FIG. 5, and all the calculations in FIG. 5 are replaced by table look-up in FIG. 6. In FIG. 6, the reference numeral 3000 is a memory for performing the function of the adder 300 and the subtractor 310 in FIG. 5, the reference numeral 3600 is a memory for performing the function of the shift registers 340 and 350, the multiplicator 360, and the logic circuit 370. The reference numeral 3800 is a memory which functions with the subtractor 380, and the reference numeral 3900 is a memory which functions with the shift register 390. Each of those memories stores the result of the calculation at the address defined by the input signals. Thus, by designating the address by the input signals, the result of the calculation is obtained by reading out the content of the memory in the designated address. Further, it should be appreciated that the memory 3600 for functioning the shift registers 340 and 350 is still simplified by deleting a pair of 1's at both the sides of the input signals since those 1's have no significant information, but only the four bits information ($P_4P_5P_6P_7$) has the significant information.

Next, the multiplication for the input signals encoded into μ-law system is described.

In case of μ-law coding system, the sum (P' or Q') of the linear expression (p or Q) and $33/2^{13}$ has the similar format as that of A-law coding system as shown below.

$$0\text{--}01P_4P_5P_6P_710\text{--}000$$

Therefore, the product P×Q is obtained by unilizing the product P'×Q' where $$P'=P+33/2^{13} \quad Q'=Q+33/2^{13}$$

Then, $$P' \times Q' = (P + 33/2^{13})(Q + 33/2^{13})$$

$$= P \times Q + 33/2^{13}(P + Q) + 33^2/2^{26}$$

Therefore, $$P \times Q + 33/2^{13} = P' \times Q' - 33/2^{13}(P+Q) -$$

$$(33^2/2^{26} + 33/2^{13})$$

Accordingly, $P \times Q + 33/2^{13}$, is the u-law expression of the product P×Q, is obtained by P'×Q', $33/2^{13}(P+Q)$, and the fixed value $(33^2/2^{26}+33/2^{13})$. The product P'×Q' is obtained by an apparatus similar to FIG. 5 and/or FIG. 6, and it should be noted that the apparatus for μ-law system is simplified compared with that of A-law system of FIGS. 5 and 6, since the μ-law system has no exceptional segment while the A-law system has the exception in the segment zero. Therefore, the NOR circuits 320 and 330, and the shift registers 340 and 350 which are provided for handling the segment zero in FIG. 5 are not necessary in handling μ-law systems. Also, the NOR circuits 320 and 330 in FIG. 6 are not necessary in handling the μ-law systems, and the capacity of the memory 3600 in FIG. 6 may be ¼ in handling the μ-law systems. On the other hand, $33/2^{13}(P+Q)$ which is the product of $33/2^{13}$ and (P+Q), and the sum (P+Q) of two PCM signals is obtained as described later, and the multiplication of that sum and $33/2^{13}$ is performed by utilizing a digital table memory.

Figure 7:
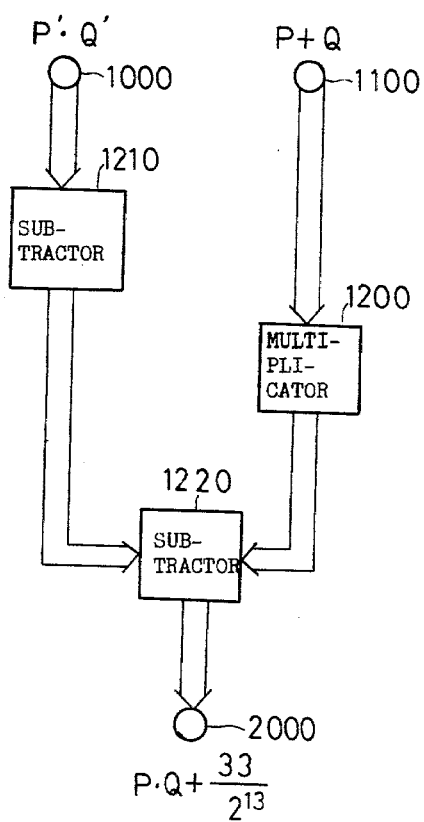
FIG. 7 is a block diagram for performing the multiplication between two PCM signals encoded by the $\mu$-law system.

FIG. 7 is a block diagram for performing the multiplication between two PCM signals encoded by the μ-law system. In FIG. 7, the reference numeral 1000 is the input terminal for accepting the product P'×Q' which is obtained by a multiplicator similar to FIG. 5 or FIG. 6, 1100 is another input terminal for accepting the sum P+Q which is obtained by the adder of PCM signals described later, 1200 is a multiplicator for providing the product of P+Q and the fixed value $33/2^{13}$, 1210 is a subtractor for subtracting the fixed value $33^2/2^{26}+33/2^{13}$ from the product P'×Q', 1220 is a subtractor for providing the difference between the outputs of the multiplicator 1200 and the subtractor 1210, and 2000 is the output terminal for providing the product of the two PCM signals.

The input signals at the input terminals 1000 and 1100 may be a PCM signal excluding a sign bit, the output signals of the subtractor 310 and the multiplicator 360 in FIG. 5, or the linear PCM signals. The multiplicator 1200 and the subtractor 1210 in FIG. 7 can have a small capacity when those devices are implemented by a memory table, since a multiplier and/or a subtrahend is a fixed value in case of FIG. 7. Therefore, the address of 7 bits is enough, and each output word has also 7 bits, thus, the capacity of the table memory is only $2^7 \times 7 = 896$ bits. The subtractor 1220 is implemented by a memory table.

Figure 8:
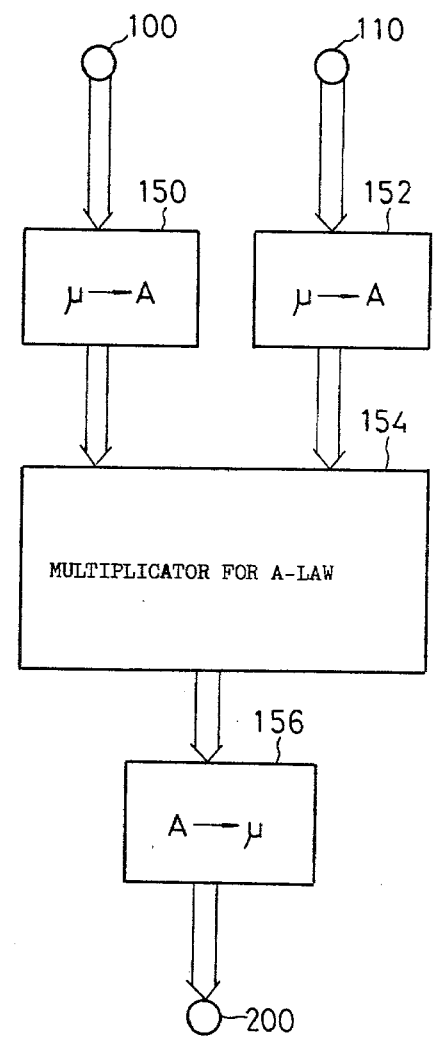
FIG. 8 is the alternative of the multiplicator for PCM signals coded by $\mu$-law system.

FIG. 8 is the alternative of the multiplicator for PCM signals encoded by μ-law system, in which the input μ-law signals are first converted to A-law signals, which are multiplicated by an A-law multiplicator, and the product is then reconverted to the μ-law signal. In FIG. 8, the reference numerals 100 and 110 are input terminals for accepting μ-law PCM signals, 200 is an output terminal for providing the product, 150 and 152 are converters for converting a μ-law PCM signal to an A-law PCM signal, 154 is a multiplicator for A-law signals which is shown in FIG. 5 or FIG. 6, and 156 is a converter for converting an A-law signal to a μ-law signal. Those converters 150, 152 and 156 are implemented by utilizing a memory table.

The multiplicators described above can be applicable to dividers. For instance, the apparatus of FIG. 5 is changed to a divider by changing an adder 300 to a subtractor, a multiplicator 360 to a divider et al, and the multiplicator of FIG. 8 is changed to a divider by changing the converter 152 for a divisor to an inverter which receives a μ-law signal and outputs the inverse number of the input signal in an A-law format.

It should be appreciated that the multiplicators of FIGS. 5, 6, 7 and 8 can replace the memory 40 in FIG. 2.

Next, an adder for PCM signals according to the present invention is described. An adder described hereinafter can replace the memory 50 in FIG. 3. According to the present invention, the addition utilizes the nature of PCM signals which have segment number and step number within segment separately. Thus, the segment number of the sum is obtained merely by the segment numbers of the input signals, and then, the step number within segment of the sum is obtained temporarily only by the step numbers within segments of the input signals, and next, when the step number within segment of the sum thus obtained is overflown, said segment number of the sum is revised.

The A-law PCM signal has the following features as apparent from the table 4.
(1) The PCM signal having the larger segment number by one is equivalent to the PCM signal having twice amplitude in a linear expression, except for the segment zero.
(2) The linear expression of PCM signals is;

$$0\text{--}01WXYZ10\text{--}00$$

and only six bits (1WXYZ1) have the effective information (in case of the segment zero, only five bits are effective), and other bits are always zero.
(3) When a signal in a linear expression is converted to a non-linear PCM signal, only four bits succeeding the first "1" are effective.

The addition of absolute portions of PCM signals is performed as follows utilizing the above three features of A-law signals.

Assuming that the absolute values of the input PCM signals are |P| and |Q|, and the segment numbers of those PCM signals are S(|P|), and S(|Q|), when S(|P|)=S(|Q|), the calculation of |P|+|Q| is performed only for six bits described in the above feature (2). On the other hand, when S(|P|)≠S(|Q|), for instance when S(|P|)>S(|Q|), the calculation for |Q| which has smaller segment number is enough to calculate for the following higher bits within six bits described in said feature (2).

$$6 - \{S(|P|) - S(|Q|)\} \text{bits}$$

Because as described in the feature (3), although more bits are calculated, the resultant bits are cancelled when the sum is converted to a non-linear signal.

Figure 9:
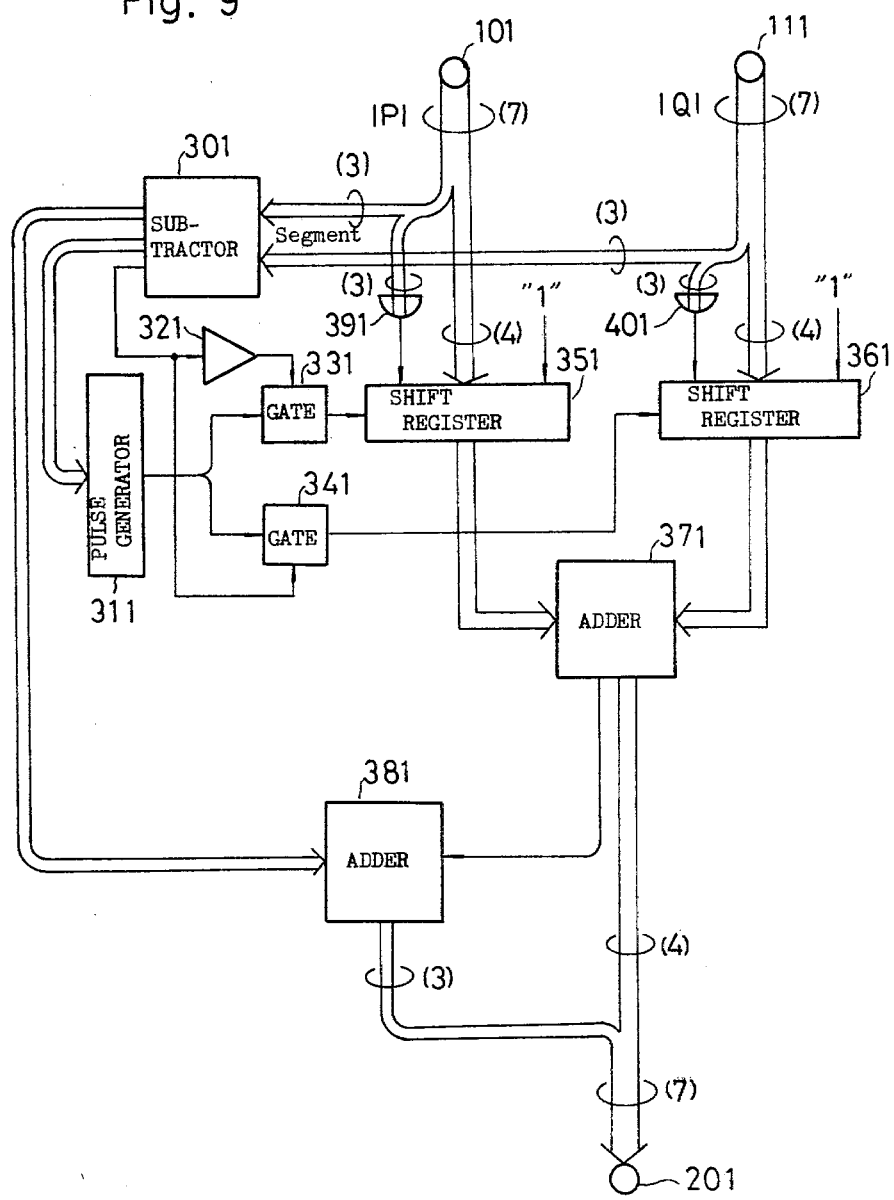
FIG. 9 is a block diagram of an adder of absolute values for A-law PCM signals.

FIG. 9 is a block diagram of an adder of absolute values for A-law PCM signals according to the present invention embodying the above principle. In FIG. 9, the numeral in each parenthesis shows the number of bits of signals at the related portion. The reference numerals 101 and 111 are input terminals for receiving input PCM signals having 7 bits for absolute values excluding sign bits, 201 is an output terminal for providing the calculated result. The reference numeral 301 is a subtractor which receives the segment numbers (each having three bits) of the input PCM signals, and functions (1) to transfer one input PCM signal which is not less than the other input PCM signal to the adder 381, (2) to apply the sign bit of the difference between two input PCM signals to the inverter 321 and the gate 341, (3) to apply the difference between two input PCM signals to the pulse generator 311 on the condition that there exists at least one bit which is not zero in each of two input signals, and (4) to apply the difference between the difference of two input signals and one (1) to the pulse generator 311 on the condition that all the bit patterns of at least one input signal are zero (which shows that the segment number of that input signal is zero). The reference numeral 311 is a pulse generator for providing the pulses the number of which is equal to the difference obtained by the subtractor 301, 321 is an inverter for reversing the sign of the difference obtained by the subtractor 301, 331 and 341 are gates. The reference numerals 351 and 361 are shift registers each of which has six bit positions. At the least significant bit position of those shift registers, the number "1" is inserted, at the central four bit positions of those shift registers, the step number within segment of the input signals are inserted, and at the most significant bit position of those shift register, the outputs of the OR-circuits 391 and 401 are inserted. The contents of those shift registers are shifted in the right direction by each output pulse of the gates 331, and 341, respectively, and in the shifting operation the overflown bit information is disregarded and "0" is inserted in the most significant bit position. The reference numeral 371 is an adder for adding the output of the shift register 351 and the shift register 361, 381 is an another adder for adding (1) one input signal which is not less than the other input signal to the subtractor 301, and (2) the overflown bit of the adder 371. The reference numerals 391 and 401 are OR-circuits which provide an output zero only when segment number of input signals is zero.

The operation of the apparatus of FIG. 9 is as follows.

The segment numbers having three bits of each input PCM signals are applied to the subtractor 301 and the OR-circuits 391 and 401, and the step numbers within segment having four bits of each input signals are applied to the shift registers 351 and 361. The subtractor 301 provides the difference between segments numbers of two input PCM signals, and said difference shows the difference between the number of figures of linear expressions of two PCM signals as shown in the table 4. The absolute value of the difference between segment numbers of two PCM signals is applied to the pulse generator 311, or when one of the segment numbers is zero, the input signal to the pulse generator 311 is subtracted by one from the output of the subtractor 301. On the other hand, the sign bit of the difference between two PCM signals is applied to the gate 331 and the gate 341 from the subtractor 301. Accordingly, when the segment number of the absolute value |P| of the PCM signal at the input terminal 101 is larger than the segment number of the absolute value |Q| of the PCM signal at the other input terminal 111, the gate 341 is opened, and the output pulse generated by the pulse generator 311 is applied to the shift register 361 through the gate 341, then, the contents of the shift register 361 is shifted in the right direction by each output pulse of said pulse generator 311 with "0" inserted at the higher bit positions in the shift operation. On the other hand, when the former is smaller than the latter, the gate 331 is opened, and the content of the shift register 351 is shifted. After the shift operation of the shift registers 351 and 361, the contents of those shift registers have the same segment numbers as the larger segment number, and are ready for calculation in linear forms. That is to say, the adder 371 performs the addition as if the input PCM signals were converted to linear forms. The OR-circuits 391 and 401 are provided in order to handle the segment number "0" like other segment numbers. Among the output of the adder 371, the four bits following the first "1" (including an overflown bit) are provided to the output terminal 201. An overflow bit of the adder 371 indicates that step numbers within segments are overflown and an overflow bit is transferred to the segment numbers. Therefore, the overflow bit is applied to the adder 381, which provides the corrected segment number by adding the overflow bit of the adder 371 to the output of the subtractor 301, which provides the segment number which is not less than the other.

The configuration of the apparatus of FIG. 9 can be simplified as follows. For instance, the subtractor 301 can be replaced to the logic circuit with AND-circuits, OR-circuits and/or inverters functioning the subtraction since the number of bits of input signals are only three. The similar replacement is possible for the adder 371. Also, the adder 381 can be replaced by a logic circuit, since the input signals have only three bits, and one bit, respectively.

Figure 10:
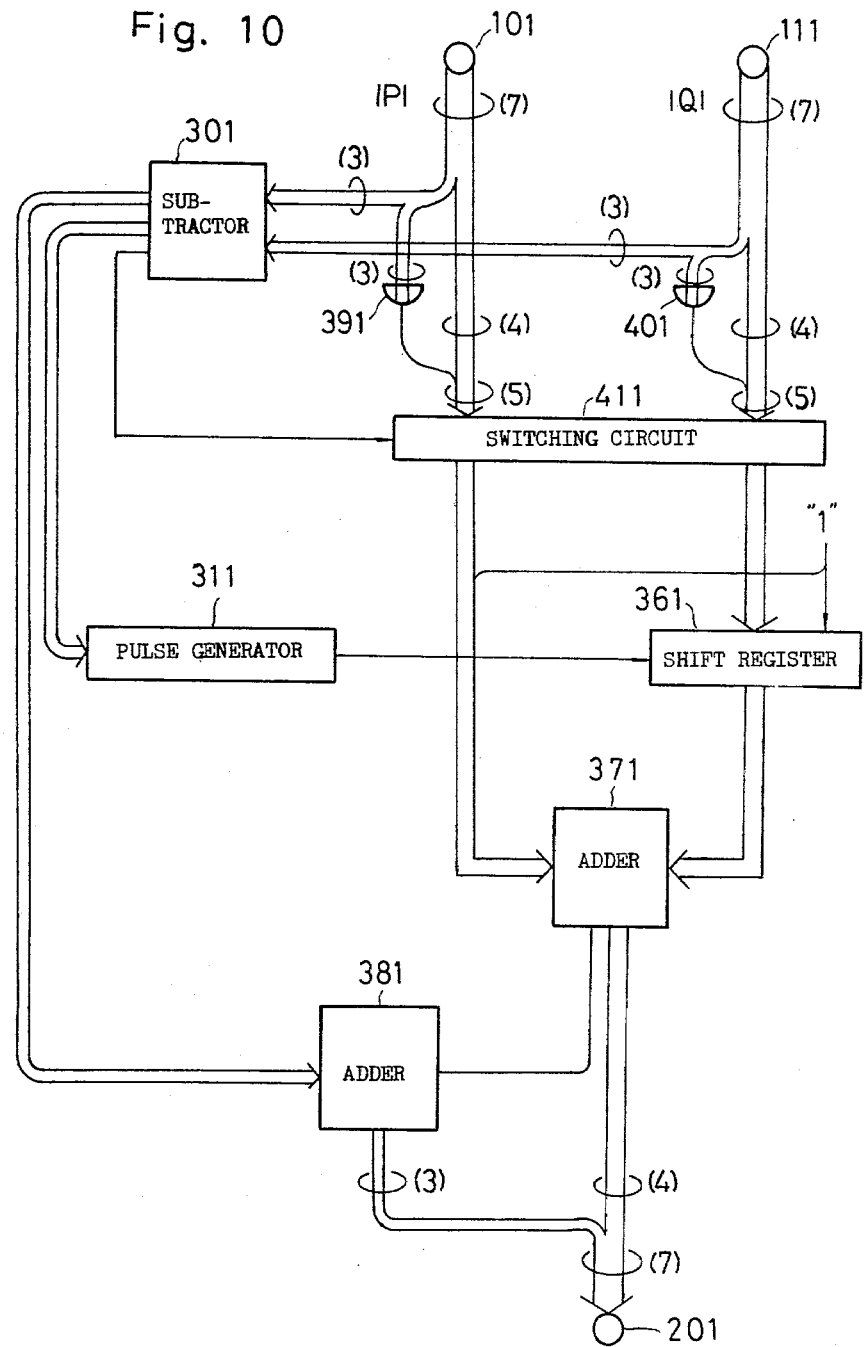
FIG. 10 is the modification of FIG. 9.

FIG. 10 is the modification of FIG. 9. In FIG. 9, the two shift registers 351 and 361 do not operate at the same time, therefore, a single shift register can function the both shift registers by switching that single shift register by the switching circuit 411. The switching control of the switching circuit 411 is carried out by the sign bit of the output of the subtraction of the subtractor 301. In the configuration of FIG. 10, the inverter 321, the gates 331, and 341, and the shift register 351 are omitted. The concept of that switching circuit is useful for other embodiments in the present invention.

Figure 11:
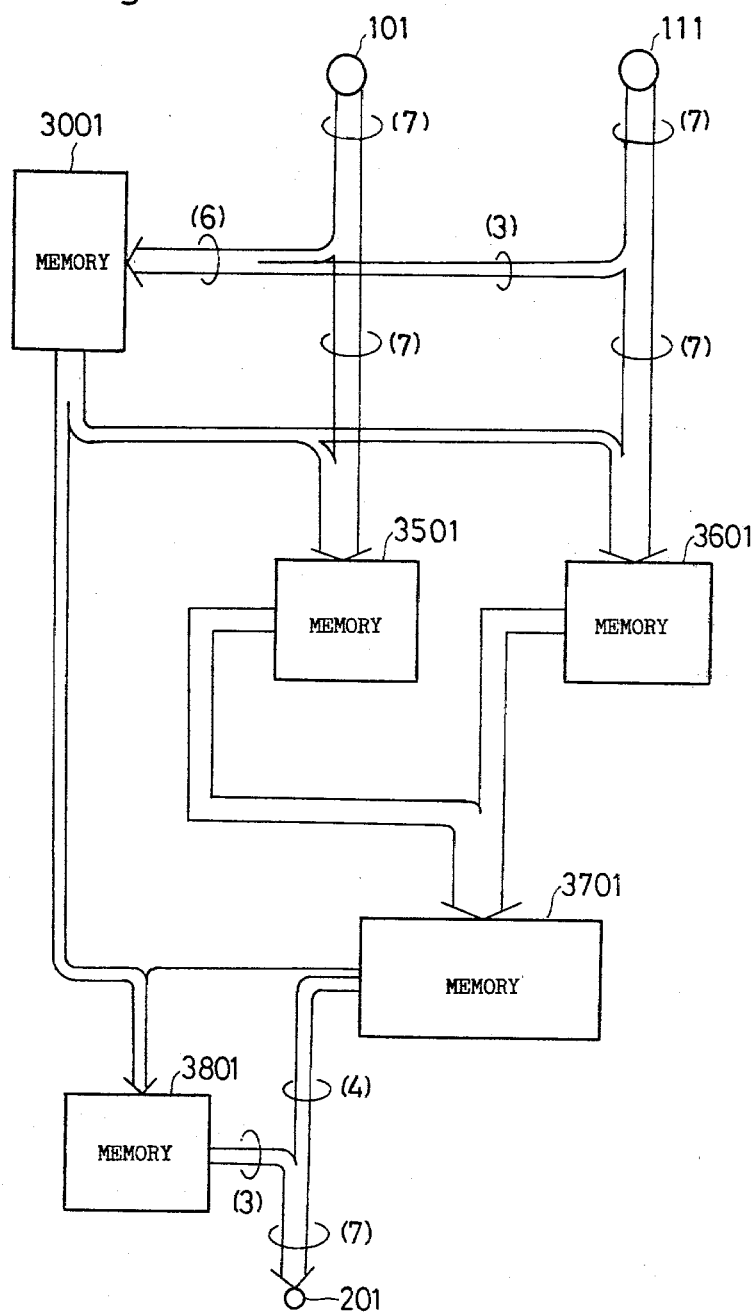
FIG. 11 is another modification of FIG. 9.

FIG. 11 is another modification of FIG. 9, and FIG. 11 has memory tables for performing the calculation function of FIG. 9. In FIG. 11, the reference numerals 3001, 3501, 3601, 3701 and 3801 are table memories for functioning the subtractor 301, the shift register 351 and the OR-circuit 401, the adder 371, and the adder 381. In operation, the segment numbers of the input PCM signals are applied to the memory 3001 as the address information. The read-out information of the memory 3001 may be a little different from the output of the subtractor 301, and may always be the difference between two segment numbers to be applied to the memories 3501 and 3601, and the segment number which is not less than the other (each four bits) to be applied to the memory 3801. On the other hand, outputs of the table memory 3001 together with each of the seven bits of input signals are applied to the memories 3501 and 3601 as the address informations of those memories, respectively. The memories 3501 and 3601 function the shift register 351 and the OR-circuit 391, and the shift register 361 and the OR-circuit 401, respectively, and the outputs of those memories are the same as those of the shift registers 351 and 361. Those outputs of the memories 3501 and 3601 are applied to the memory 3701 as the address indication, and that memory 3701 performs the addition. The overflow bit obtained by the memory 3701, and the segment number which is a part of the output of the memory 3001 are applied to the memory 3801 as the address information, and the memory 3801 functions to add those input signals to provide the segment number of the final sum of the two input PCM signals. The step number within segment of the final sum is obtained at the output of the memory 3701.

It should be noted tht the memories in FIG. 11 function calculation means in FIG. 9. Therefore, the combination of memories in FIG. 11 and calculation means in FIG. 9 is possible. For instance, only the adder 371 in FIG. 9 is replaced by the memory 3701, or the memory 3001 in FIG. 11 can be replaced by the subtractor 301.

Figure 12:
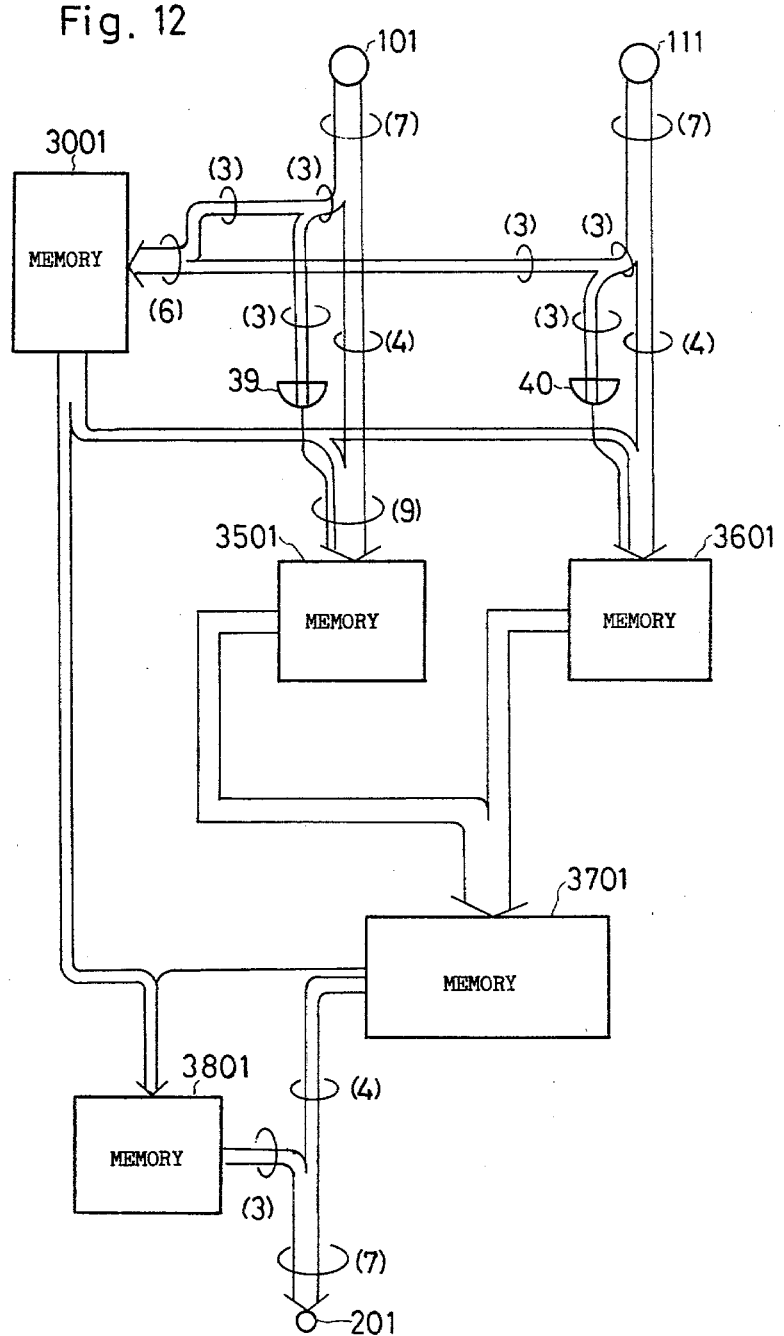
FIG. 12 is one embodiment of the combination of FIG. 9 and FIG. 11.

FIG. 12 is one embodiment of the combination of FIG. 9 and FIG. 11. FIG. 12 has the configuration of FIG. 11 and the OR-circuits 391 and 401 of FIG. 9, and by utilizing that configuration, the number of bits of input addresses of the memories 3501 and 3601 are decreased, and thus, the capacity of those memories is decreased. The capacity of the memories of FIG. 12 further reduced as follows. The address information to the memory 3701 having the segment number not less than the other has the pattern "1 WXYZ 1" in case that the segment number is not "000"=0, or the pattern "0 WXYZ 1" in case that the segment number is "000"=0. Therefore, it can be seen which memory 3501, or 3601 has said pattern by utilizing the sign bit of the subtraction in the output of the memory 3001, and thus, the number of bits (which are initially six) of the input signals of those memories can be reduced to five bits. Thus, the number of bits of the address of the memory 3701 is reduced by two bits, and then, the capacity of the memory 3701 is reduced to ¼. Generally speaking, when a table memory is used for addition and/or subtraction and/or shift register, the memory area for the fixed input signal can be omitted, and the memory area for the actual variables is enough, thus, by omitting the former, the necessary capacity of a memory is reduced.

Many other modifications of FIG. 11 are possible. First, the memories 3701 and 3801 can be consolidated to a single memory. In that case, the address information of the consolidated memory is the outputs of the memories 3501 and 3601, and a part (three bits) of the output of the memory 3001, and a plurality of outputs are obtained at the same time. By using a consolidated memory, the total capacity of the memory is increased a little, and the delay time in the calculation is considerably reduced as the number of read out times of a memory is reduced. The combination of memories is not restricted to the memories 3701 and 3801, but the combination of memories 3501 and 3601, the combination of memories 3501, 3601 and 3701, and the combination of memories 3501, 3601, 3701 and 3801 are possible. Of course the replacement between a table memory and a hardware calculator is always possible, and the replacement is applicable also to the following embodiments.

Figure 13:
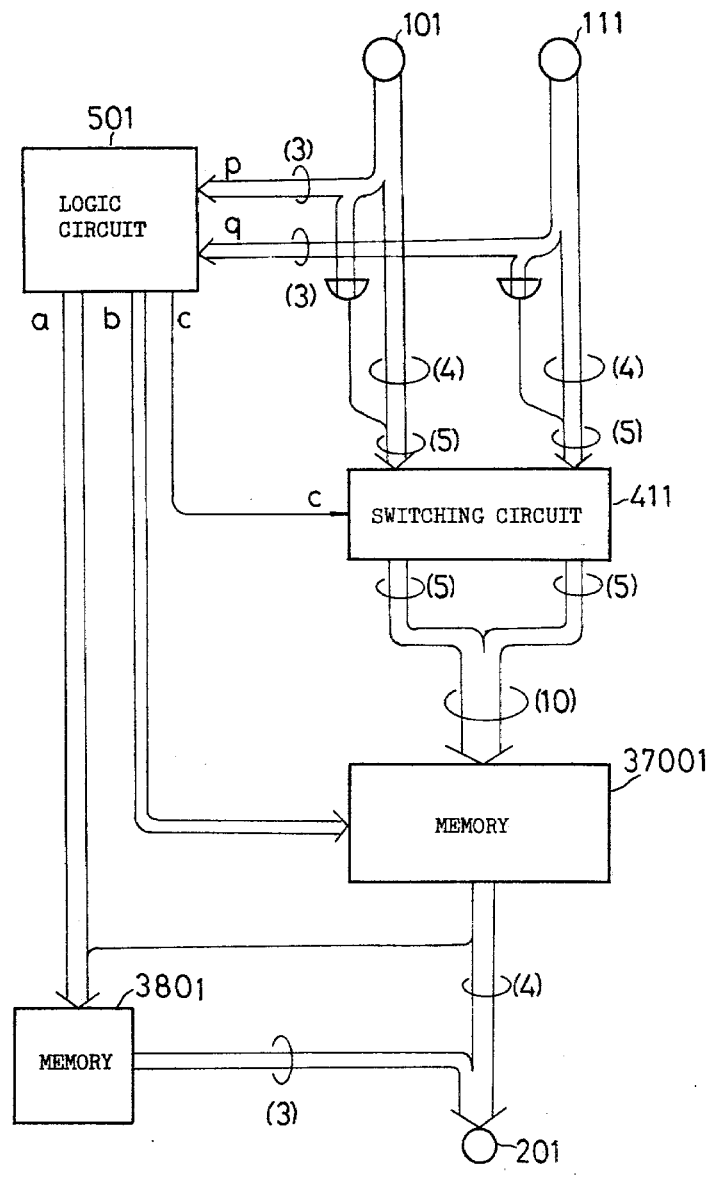
FIG. 13 is the embodiment which utilizes memories in the embodiment of FIG. 10.

FIG. 13 is the embodiment which utilizes memories in the embodiment of FIG. 10. In FIG. 13, the reference numeral 501 is a logic circuit which functions the subtractor 301 in FIG. 10, 37001 is a table memory which functions the shift register 361, the adder 371, the pulse generator 311 in FIG. 10. The operation of the apparatus of FIG. 13 is the same as that of FIG. 10.

Figure 14:
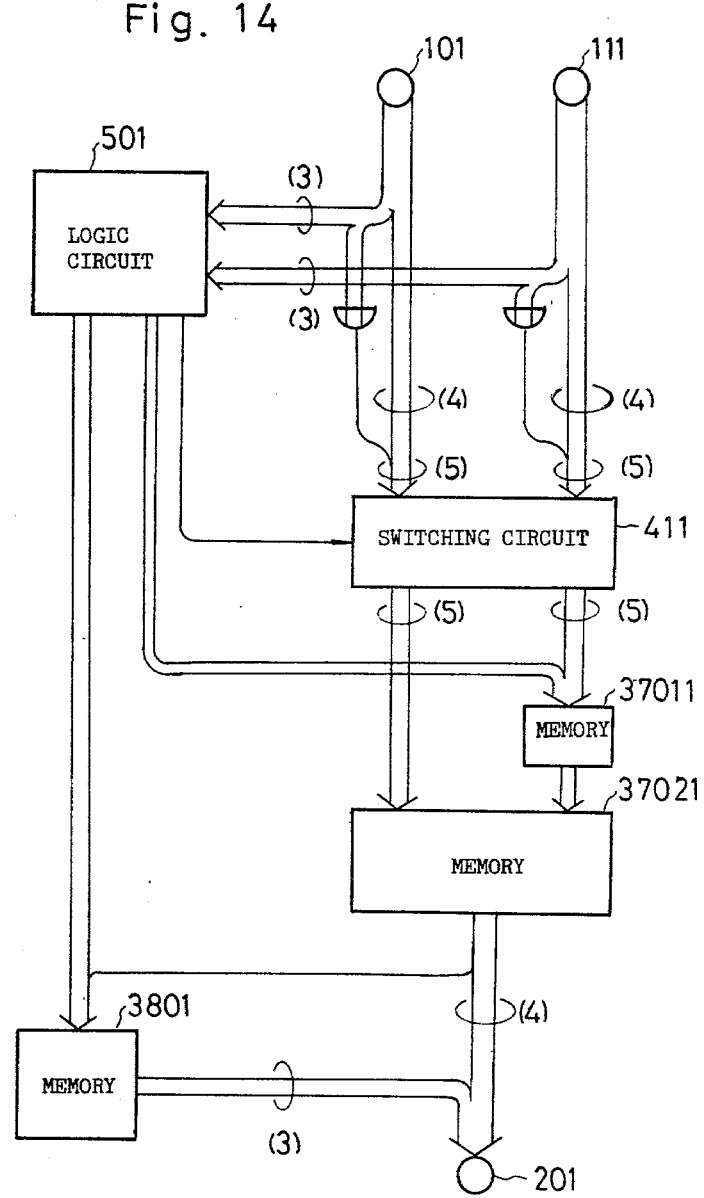
FIG. 14 is the modification of FIG. 13.

FIG. 14 is the modification of FIG. 13. While the memory 37001 in FIG. 13 functions both a shift register and an adder, those two functions are separated in FIG. 14. The separation of that memory provides the reduction of the capacity of the memory. In FIG. 14, the memory 37011 functions the shift register 361 of FIG. 10, and the memory 37021 functions the adder 371 of FIG. 10.

Figure 15:
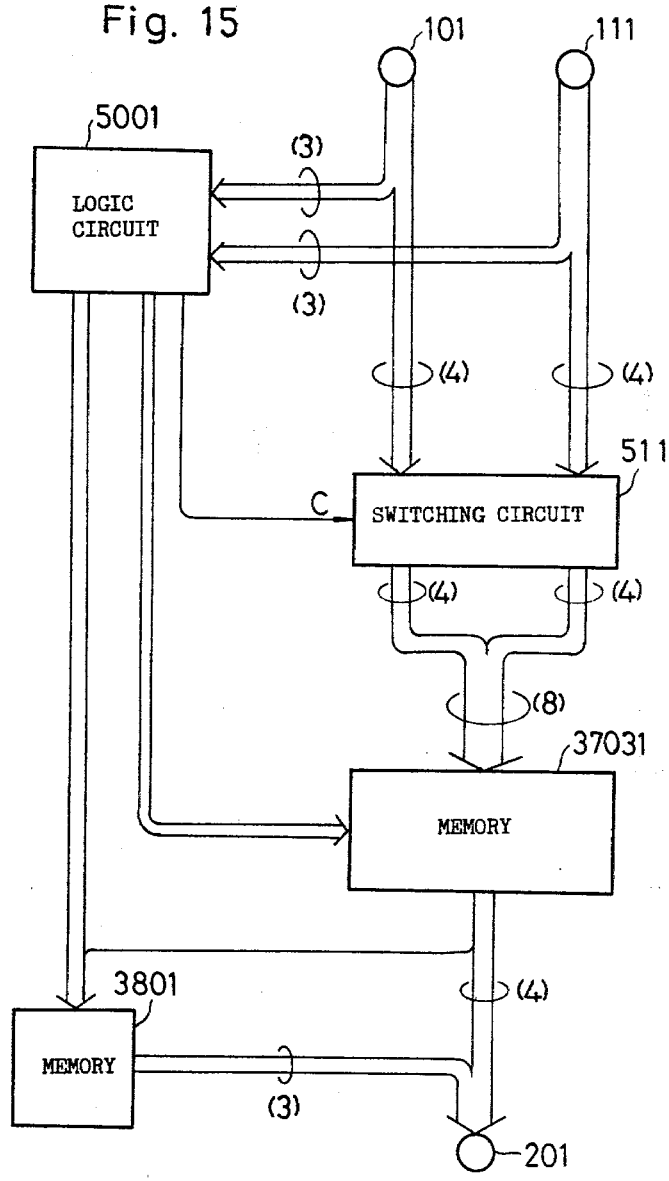
FIG. 15 is another modification of FIG. 13.

FIG. 15 is another modification of FIG. 13. In FIG. 15, the input signals of the switching circuit 511 are merely four bits of the step numbers within segments of two input signals, and instead, the logic circuit 501 and the memory 37001 in FIG. 13 are replaced to the logic circuit 5001 and the memory 37031 in FIG. 15. The logic circuit 5001 in FIG. 15 is the same as that of FIG. 13 except that the output (c) of the logic circuit 5001 has not only the difference between segment numbers $|p-q|$, but also, the information whether p or q is zero (segment zero). The inputs of the memory 37031 are said information and the output of the switching circuit 511 as the address information. The memory 37031 is supposed to have a table for each segment difference $|p-q|$, that is to say, the memory 37031 has 15 tables, in which seven tables are provided for the segment difference 0 through 6 in case none of the segments is zero, and eight tables are provided for segment difference 0 through 7 in case at least one segment is zero. The memory 37031 performs not only an addition but also the exceptional process for the segment 1. Thus, by performing a calculation by a memory, a complicated function which is not obtained by a simple hardware logic is obtained easily, and the calculation time of a memory is very high compared with a multiplicator citcuit, sine the necessary operation is merely to read a memory.

Next, the addition for $\mu$-law signals of the table 5 is described. The $\mu$-law is the same as the A-law except the following points.

(a) The bias value $33/2^{13}$ is added to $\mu$-law signals.
(b) The pattern of the segment 0 is the same as the pattern of other segments, and no exception exists.

The correction of the bias value $33/2^{13}$ included in a linear expression is interpreted as follows. When the absolute values of the input PCM signals are $|P|$ and $|Q|$, the values $|P|+33/2^{13}$ and $|Q|+33/2^{13}$ are shown in the table 5, and the non-linear PCM signal of the sum $|P|+|Q|+33/2^{13}$ can be obtained by utilizing the table 5. Since the correct addition is as follows;

$$(|P|+33/2^{13})+(|Q|+33/2^{13})=(|P|+|Q|+33/2^{13})+33/2^{13}$$

either the subtaction of $33/2^{13}$ from the sum, or the subtraction of the bias value $33/2^{13}$ from one of the input PCM signals before the addition must be performed.

Now, the implementation of the addition for the μ-law is described. The addition for the μ-law signals is performed by modifying the embodiments of FIGS. 9 through 15 for the A-law signals as follows.

(a) In FIG. 9, the bias value "33/2$^{13}$" must be subtracted from one of the input PCM signals, the output of the adder 371, or the output terminal 201.

(b) The circuits for the exceptional treatment for the segment 0 for the A-law signals like OR-circuits 391 and 401 in FIG. 9 can be omitted.

The modified portion of FIGS. 9 through 15 for treating μ-law signals is described in accordance with FIGS. 16 through 22.

Figure 16:
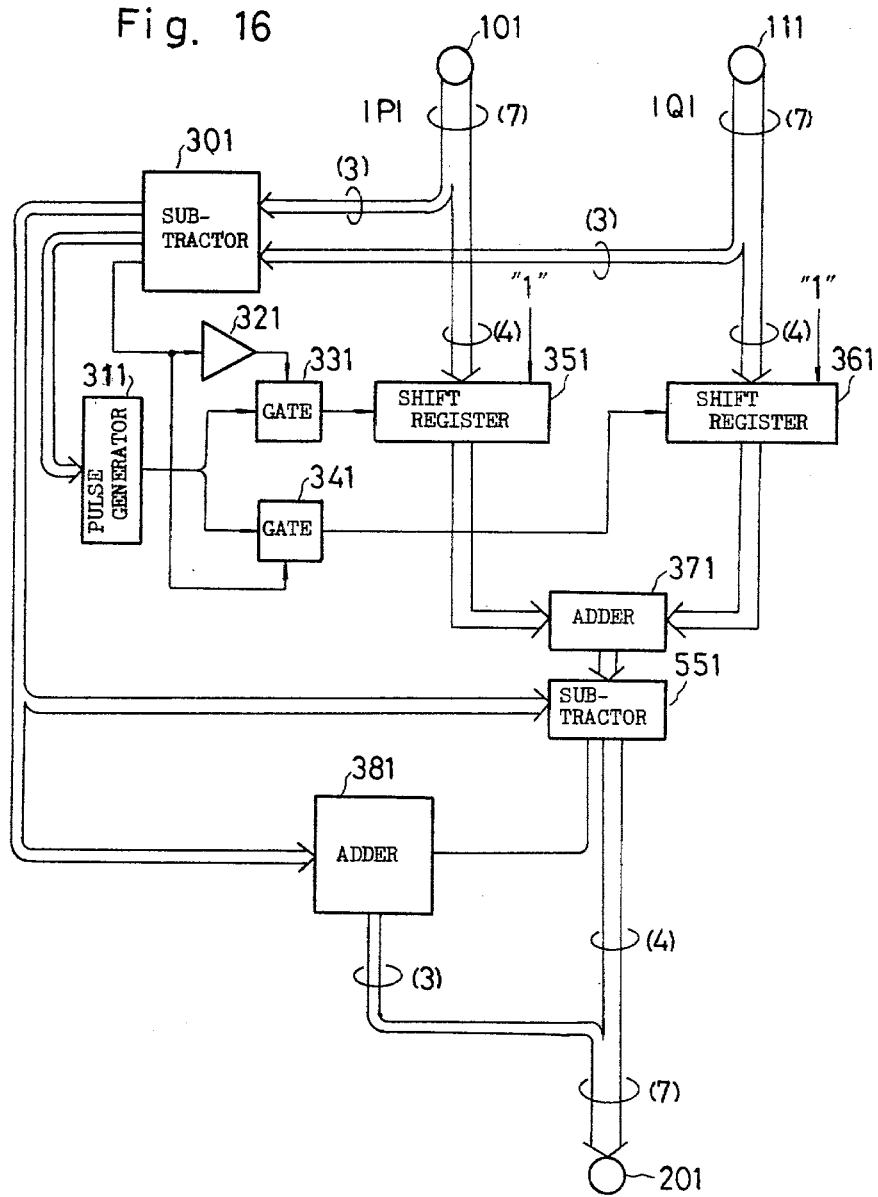
FIG. 16 is the modification of FIG. 9 for performing the addition of the $\mu$-law signals.

FIG. 16 is the modification of FIG. 9 for performing the addition of μ-law signals. The numeral in the parentheses in FIG. 16 shows the number of bits. The gates 391 and 401 in FIG. 9 are not necessary in FIG. 15, since no exceptional process for the segment zero is necessary in μ-law signals. The subtractor 551 for subtracting the bias number 33/2$^{13}$ is provided at the output circuit of the adder 371. That subtractor 551 for subtracting the bias value may also be inserted just after the input terminals 101 and 111.

Figure 17:
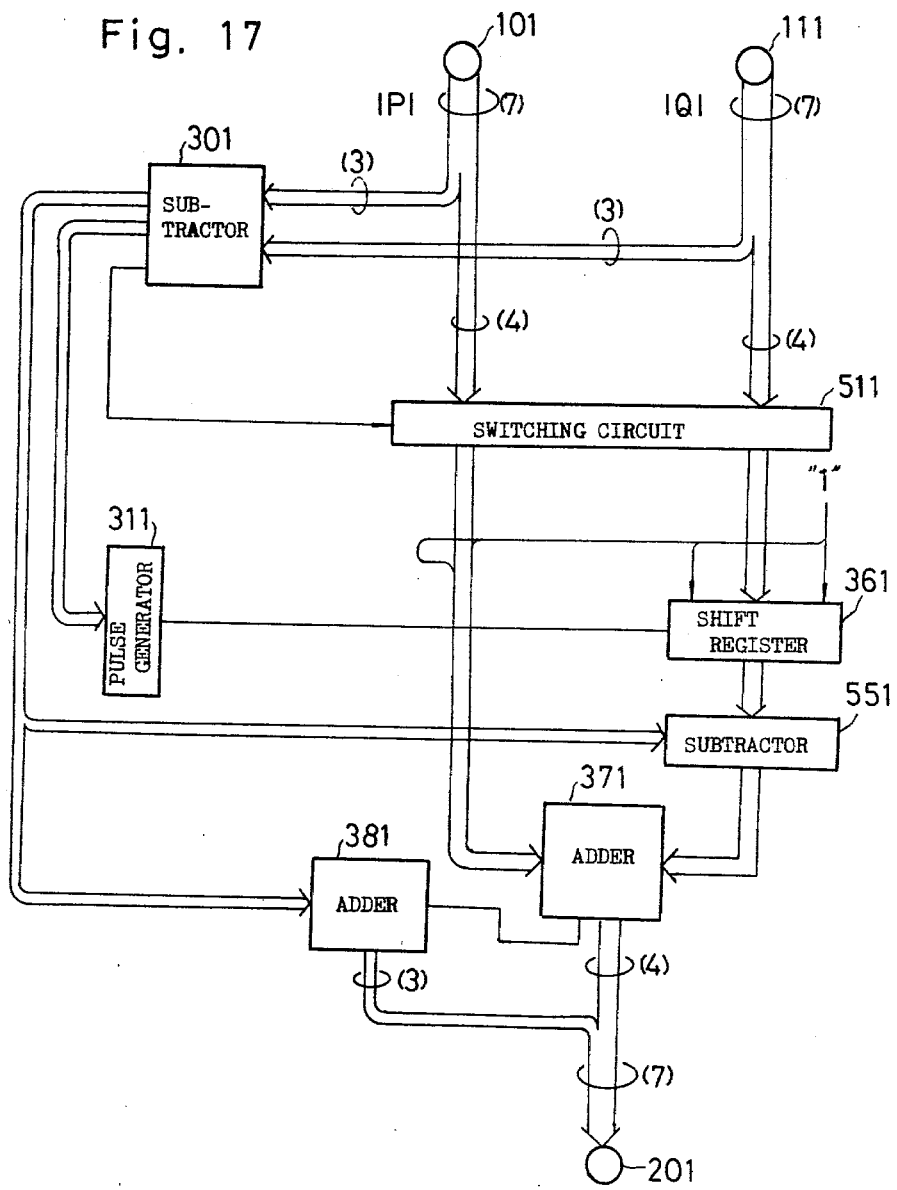
FIG. 17 is the modification of FIG. 10 for performing the addition for $\mu$-law signals.

FIG. 17 is the modifications of FIG. 10, for performing the addition for μ-law signals. The gates 391 and 401 in FIG. 10 are omitted in FIG. 17, the switching circuit 411 in FIG. 10 is changed to the switching circuit 511 which has a pair of four bits input signals, and subtractor 551 for adjusting the bias value is inserted between the output of the shift register 361 and the adder 371. The subtractor 551 may be put at the input of the shift register 361 on the condition that the subtractor 301 provides the information about the relative relation of figures between the bias value 33/2$^{13}$ and the output of the switching circuit 511 to the subtractor 551. The subtractor 551 might be put between another output of the switching circuit 511 and the adder 371.

Figure 18:
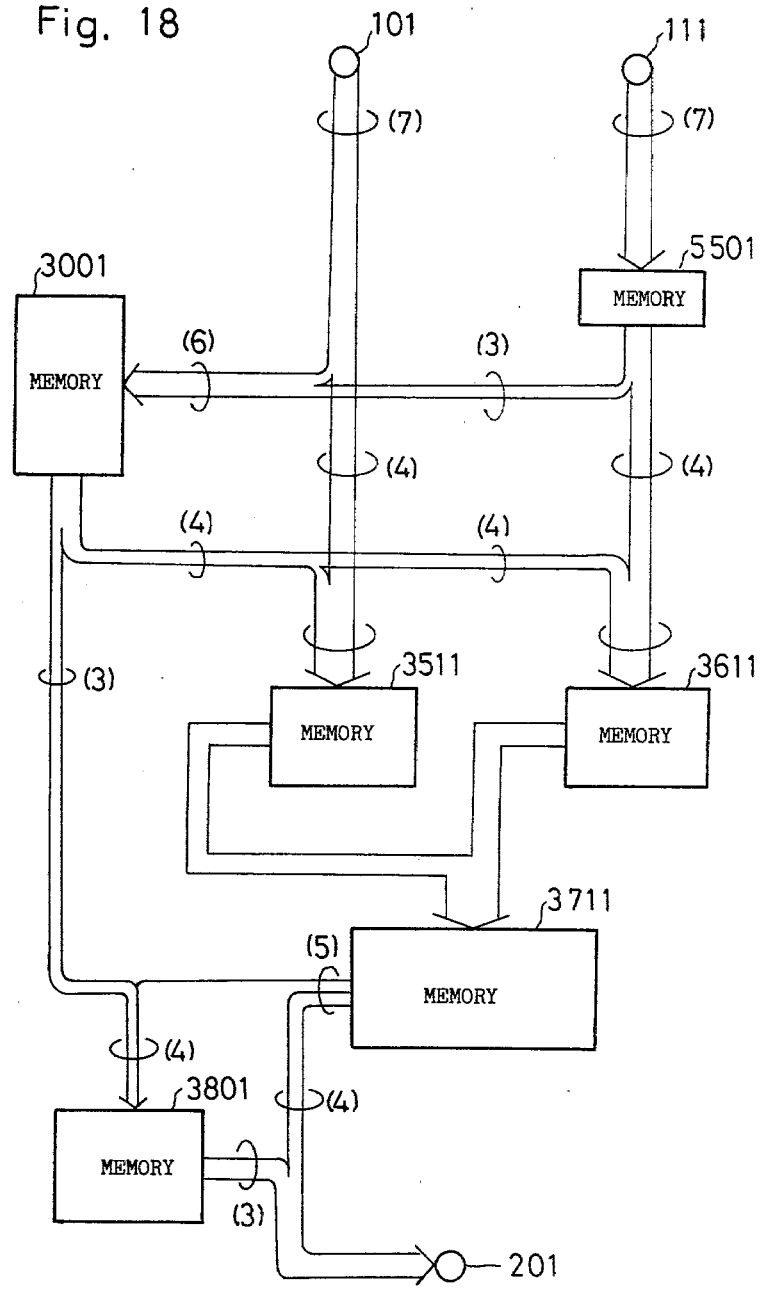
FIG. 18 is the modification of FIG. 17 for performing the calculation function using table memories.

FIG. 18 is the modification of FIG. 17 and performs the calculation function utilizing table memories. In FIG. 18, the adjustment for the bias value is performed by the table memory 5501 which subtracts the bias value 33/2$^{13}$ from the input signal.

Figure 19:
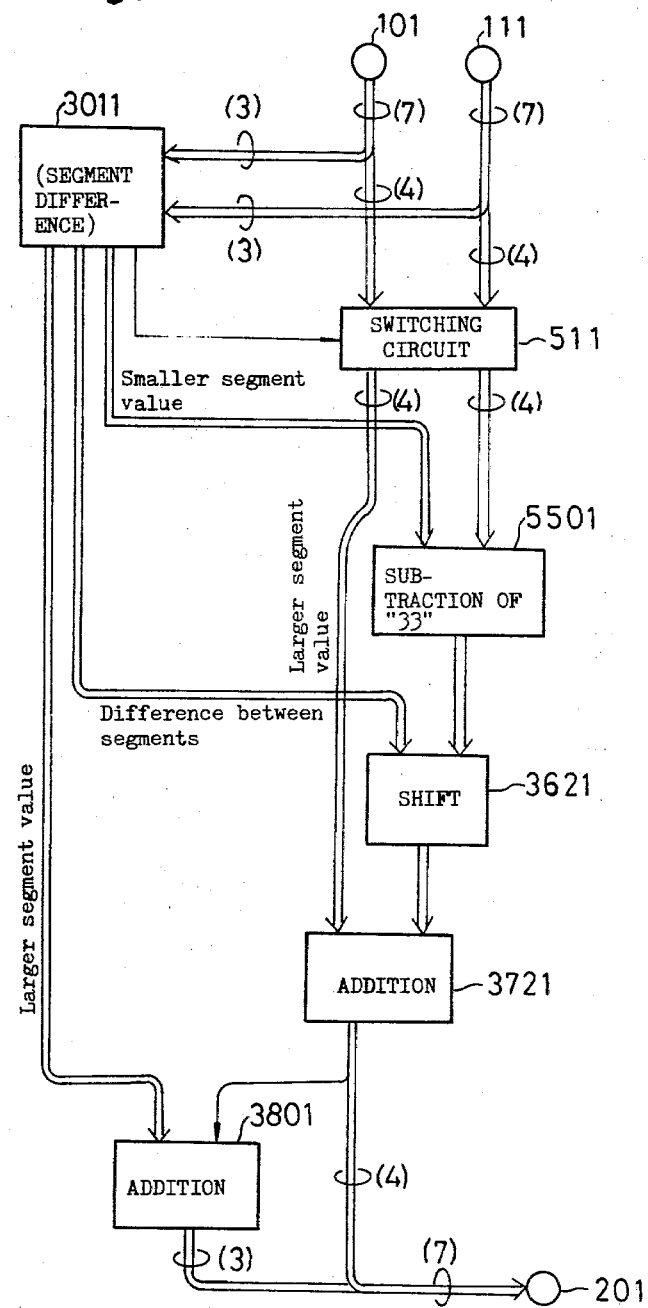
FIG. 19 is the modification of the embodiment of FIGS. 13, 14 and 15.

FIG. 19 is the modification of the embodiment of FIGS. 13, 14 and 15. The function in all the boxes in FIG. 19 is carried out by table memories. The memory 3011 receives three bits of each input PCM signals at the input terminals 101 and 111, and provides the outputs of (1) the segment difference between two input signals, (2) the larger segment number, and (3) the smaller segment number. The reference numerals 3621 and 3721 are also memories. The sign bit of the segment difference in the outputs of the memory 3011 is applied to the switching circuit 511, which provides a pair of outputs (a) and (b), the former provides the step number within segment of the input signal having segment number not less than that of the other, and the latter provides the step number within segment of the input signal not larger than the other. The latter output (b) is applied to the memory 5501 which compensates the bias value, and the compensated output of the memory 5501 is applied to the memory 3621 which shifts the content by the bit positoins equal to the segment difference. The pair of step numbers within segments thus having the coincided figures are added to each other in the memory 3721.

As mentioned above, the calculation of the μ-law signals is performed by modifying the circuits for A-law signals.

Further, when one input signal is an A-law signal and the other input signal is a μ-law signal, a converter for converting the A-law signal to μ-law signal, or the μ-law signal, to the A-law signal mounted at the input of a calculator is available.

Figure 20:
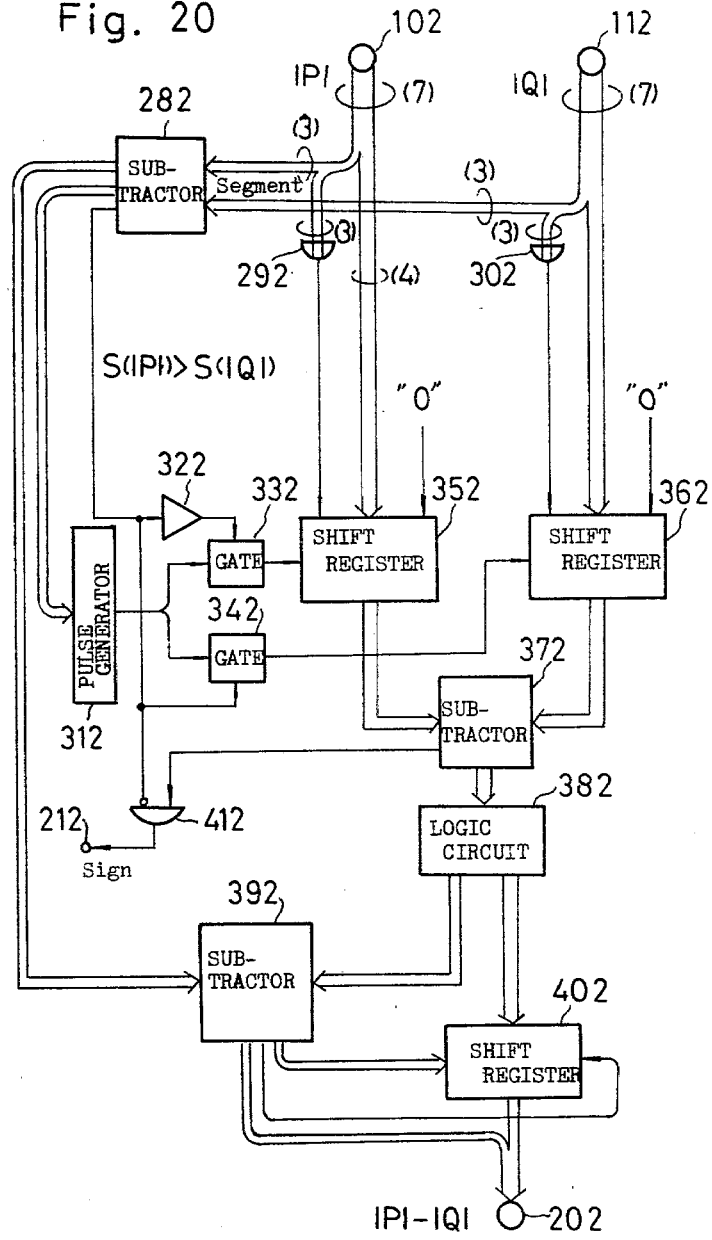
FIG. 20 is a block diagram of the subtractor for absolute value of A-law PCM signals.
Figure 21:
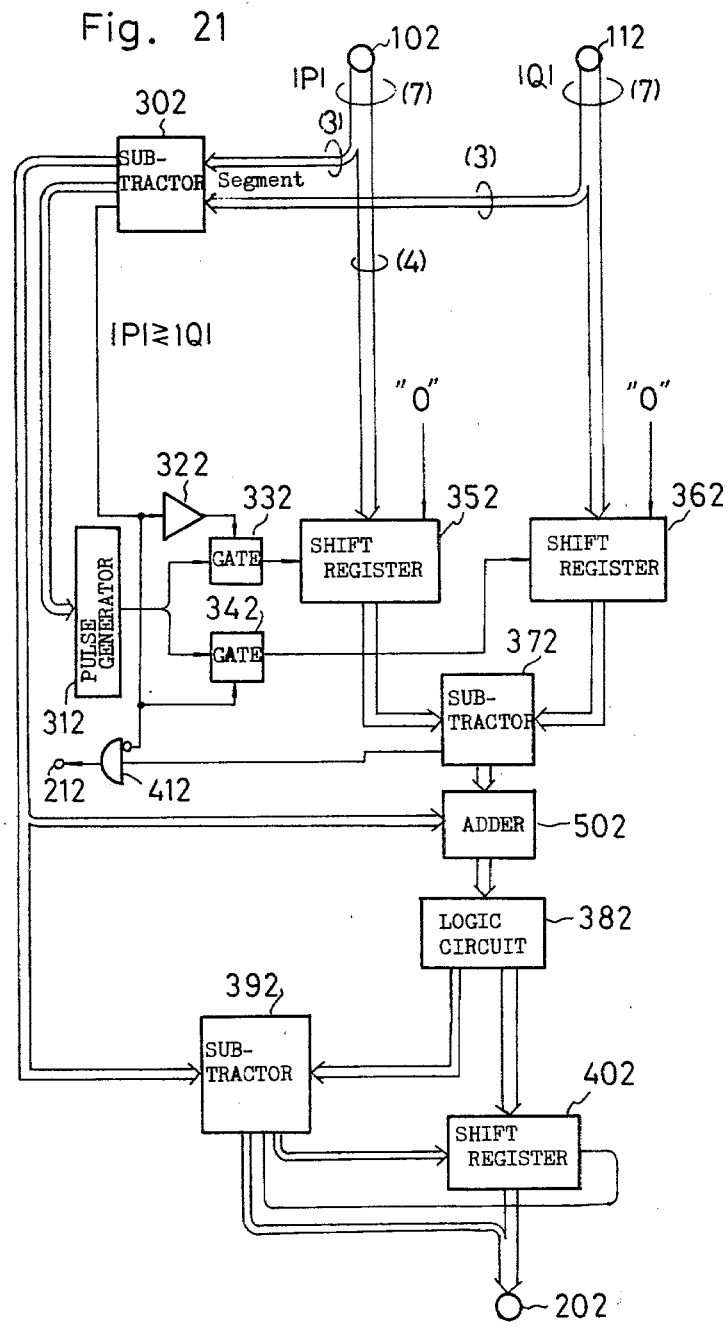
FIG. 21 is an embodiment of the subtractor for $\mu$-law signals.
Figure 22:
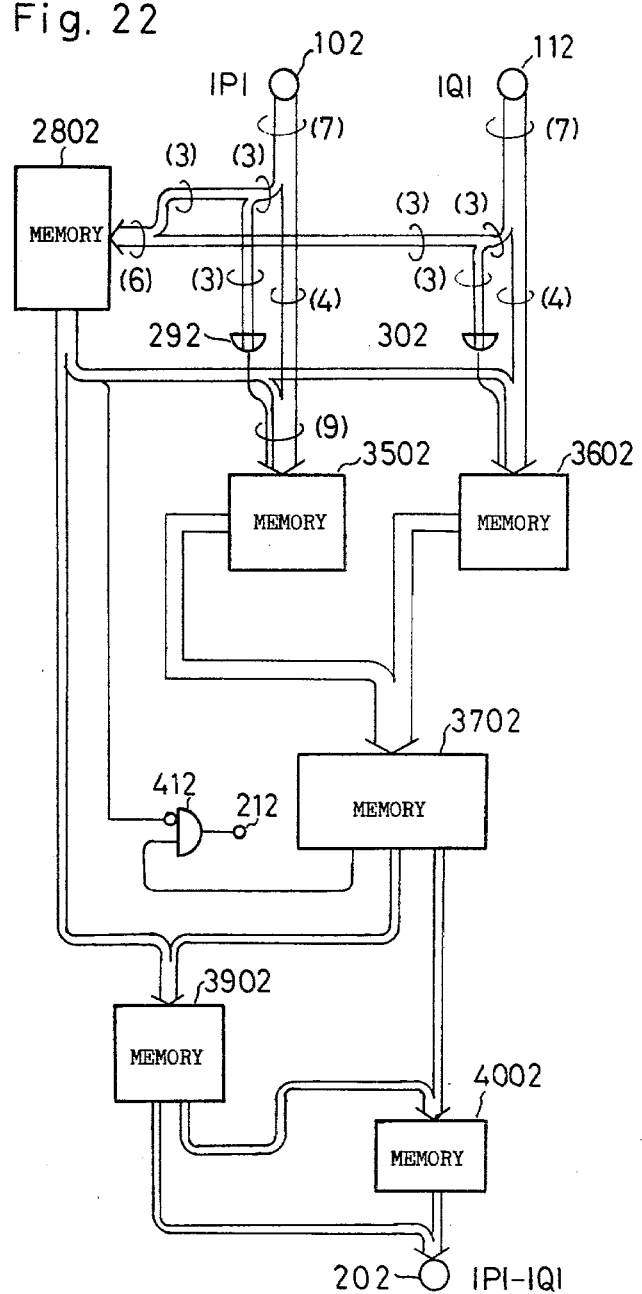
FIG. 22 is the modification of FIG. 20 and utilizes table memories for each calculators in FIG. 20.

Next, a PCM signal subtractor according to the present invention is described in accordance with FIGS. 20 through 22, and the following subtractor can replace the memory 51 in FIG. 3.

As described above, the PCM signals shown in the tables 4 and 5 have the following natures.

(a) In case of A-law signal, the signal having the larger segment number by one is twice as large in a linear expression, except for that of segment zero. In case of segment one, if that segment number "1" is replaced by "0", the corresponding linear value is reduced by ½$^7$, but that linear value is not halved, that is to say, the most significant bit in the significant bits (see the paragraph (b) below) in the linear expression is changed from "1" to "0". In case of μ-law signal, neglecting that the fixed bias value 33/2$^{13}$ is included in the linear value, the increase of a segment number by one is equal to the twice of linear expression.

(b) Assuming that a PCM signal excluding a sign bit is;

$A_1A_2A_3WXYZ,$ then, the linear expression of that PCM signal is

0–01WXYZ10.000.

Thus, only six bits(1WXYZ1) are significant, except for segment number zero in A-law signa, a bias value is always included in a linear value.

(c) When a linear expression is converted to a non-linear signal, only four bits following the "1" at the extreme left are significant.

Therefore, it should be noted that a PCM signal thus encoded in an A-law signal or μ-law signal looks like a floating point number, in which segment number corresponds to an exponent of a floating point number, and step number within segment corresponds to a mantissa or fraction of a floating point number, except for the fixed bias value in a μ-law signal and segment zero in an A-law signal. The present invention calculates PCM signals by handling the same as if they were floating point numbers.

First, the subtraction between A-law signals is described. Assuming that the absolute value of the input PCM signals are |P| and |Q| and the segment numbers of those signals are S(|P|), and S(|Q|), then, if S(|P|)=S(|Q|) is satisfied, the difference |P|−|Q| is obtained by calculating only six bits described in said nature (b). On the other hand, if S(|P|)≠S(|Q|) is satisfied, for instance if S(|P|)>S(|Q|) is satisfied, d=S(|P|)−S(|Q|) is apparently between 1 and 7(1≦d≦7). Thus, the number of bits to be shifted for coinciding the figures of step numbers within segments are equal to (d).

When d=1, the calculation for seven bits is enough, because of said natures (a) and (b) and that the number of shift for coinciding figures is one. Further, in case of d=1, the calculation for six bits may be enough since the step numbers after coinciding figures are "1xxxx10" for P, and "01xxxx1" for Q, and as the least significant bits "0" and "1" are fixed, those bits can be omitted without losing the available information.

In the case of d≧2, the number of bits lost in coinciding figures for subtraction of step numbers is less or equal to 1 as shown in the table 6. In this case, the linear expressions of P and Q before coinciding figures are "0...01WXYZ10...", and "0...01WXYZ10...", respectively, therefore, the linear expression of P after coinciding figures is expressed as "1WXYZ0", and the calculation for Q is enough to calculate for the bits corresponding to said P. Accordingly, the subtraction of step numbers can be performed only by the calculation of six bits, irrespective of the value of d. Further, the least significant bit among said six bits can be always repleaced by zero.

TABLE 6

| d | Number of bits lost (r) |
|---|---|
| 0 | 1≦r≦7 |
| 1 | 0≦r≦1 |
| 2 | 0≦r≦1 |
| 3 | 0≦r≦1 |
| 4 | 0≦r≦1 |
| 5 | 0≦r≦1 |
| 6 | 0≦r≦1 |
| 7 | 0≦r≦1 |

FIG. 20 is a block diagram of the subtractor for absolute values of A-law PCM signals according to the present invention. In FIG. 20, the reference numerals 102 and 112 are input terminals for applying input PCM signals excluding sign bits, 202 is an output terminal for providing the calculated absolute value, 212 is an output terminal for providing the caluculated sign bit, 282 is a subtractor which receives the segment numbers (each three bits) of input PCM signals and functions (1) when a segment number is "000", that segment number is changed to "001", and to perform the subtraction, (2), to apply the absolute value of the result of the subtraction to a pulse generator 321, (3) to apply the sign bit of that subtraction to an inverter 312, gate 342, and gate 412, and (4) to apply the larger segment number to a subtractor 392. The 292 and 302 are OR-circuits for detecting a segment number zero, 312 is a pulse generator which provides pulses the number of which is equal to the output value of the subtractor 282, 322 is an inverter having the input signal of the sign bit of the calculated result of the subtractor 282, 332, and 342 are gates. The 352 and 362 are shift registers each having six bit positions, the central four bits of them receive the step number within segment of each input PCM signal, and the least significant bit receives zero, and the most significant bit receives the output of the gate 292, or 302. The contents of those shift registers are shifted in the right direction by each output pulse of the gates 332, and 342, respectively. In those shift operation, an overflow bit is disregarded, and "0" is inserted in the most significant bit position. The reference numeral 372 is a subtractor, 382 is a logic circuit which receives the absolute value portion of the output of the subtractor 372, applies the number of continuous 0's from the most significant bit position to the subtractor 392, and applies five bits following to the most significant "1" to the shift register 402. The reference numeral 392 is a subtractor which subtracts the output of the logic circuit 382 from the output of the subtractor 282, and when the result of said subtraction is negative or zero, the absolute value of the result of said subtraction is applied to the shift register 402 the content of which is shifted by the bit positions equal to said absolute value in the right direction, and the segment number zero is output at the output terminal 202. On the other hand, when the result of said subtraction is positive, the absolute value of the same is applied to the output terminal 202, and the content of the shift register 402 is shifted by one bit position in the lift direction. The 402 is a shift register receiving the output of the logic circuit 382, and shifting the content of the same in either left direction or right direction according to the control information from the subtractor 392. And 412 is an inhibit gate.

The operation of the apparatus of FIG. 20 is as follows. The input PCM signals each having 7 bits for the absolute values are applied to the input terminals 102, and 112, respectively, and the segment numbers are applied to the subtractor 282, and the OR-circuits 292 and 302, while the step numbers within segments are applied to the shift registers 352 and 362, respectively. Each of OR-circuits 292 and 302 provides the output signal zero when the input PCM signal has the segment number zero, and substantially provides the most significant bit of the table 4. Thus, the shift registers 352 and 362 provide the step numbers within segments, of the PCM signals, respectively.

The subtractor 282 provides one of the outputs of the same (d=|S(|P|)−S(|Q|)| to the pulse generator 321, and sign bit which shows which segment is larger to the gate 332 through the inverter 322 and the gate 342.

Accordingly, when the absolute value |P| of the segment number of the PCM signal P at the input terminal 102 is larger than the absolute value |Q| of the PCM signal Q at the input terminal 112, the gate 342 opens and the output pulses of the pulse generator 312 are applied to the shift register 362, and the content of said shift register 362 is shifted by each of said output pulses in the right direction with zero inserted at the most significant bit position of the shift register 362. On the contrary, when |P| is not larger than |Q|, the gate 332 is opened, and the content of the shift register 352 is shifted. Thus, the shift registers 352 and 362 coincide the figures of the segment numbers to the larger one for enabling the calculation. Then, the subtractor 372 performs the subtraction between two input PCM signals as if the signals were converted to linear signals shown in the table 4. When some figures are lost in the calculation in the subtractor 372, as shown in the table 6, the number of lost figures is applied to the subtractor 392, which revises the segment number. When the revised segment number in the subtractor 392 is positive, that value is applied to the upper three bit positions of the output terminal 202 as the segment number, and the four bits following the extreme left of "1" of the output of the subtractor 372 are applied to the lower four bits of the output terminal 202 as the step number within segment. When the revised segment number in the subtractor 392 is zero, the calculated correct segment number is zero, and the step number within segment is obtained by the four bits following the extreme left "1" in the output of the subtractor 392 (see the feature c) mentioned above). Further, when the revised segment number in the subtractor 392 is negative, the shift register 402 is shifted in the right direction in order to re-compensate the step number within segment by the absolute number of that negative value. The resultant segment number in that case is of course zero.

On the other hand, the sign bit of the difference $|P|-|Q|$ is obtained at the output terminal 212 as mentioned below. When $S(|P|) > S(|Q|)$ is satisfied, $|P| > |Q|$ is of course satisfied, and the control information from the subtractor 282 to the gate 412 is ON, then, the output at the output terminal 212 is OFF (+). On the other hand, when $S(|P|) \leq S(|Q|)$ is satisfied, the output of the subtractor 372 is directly the sign bit of the difference $|P|-|Q|$.

The subtractor for μ-law PCM signals is similar to that of A-law signals of FIG. 20, except for the correction of the above mentioned bias value. The correction of the bias value is performed by adding $33/2^{13}$ to the result of the subtraction as apparent from the formula below.

$$||P|-|Q||+33/2^{13} = |(|P|+33/2^{13}) - (|Q|+33/2^{13})|+33/2^{13}$$

Alternatively, it is possible to subtract the bias value from the subtrahend $(|Q|+33/2^{13})$, or it is possible to add the bias value to the minuend $(|P|+33/2^{13})$. Accordingly, the subtractor of the absolute values of μ-law PCM signals is implemented based upon the subtractor for A-law PCM signals except the following two points.

(a) To add the bias value to the result of the subtraction of the step number, or to subtract the bias value from the step number of the subtrahend after the figures are coincided, or to add the bias value to the step number of the minuend after the figures are coincided.

(b) To remove the circuits for exceptionally treating the segment "0" in A-law signals (for instance, OR-circuits 292, and 302 in FIG. 20 are removed), since no exception resides in μ-law signals.

FIG. 21 is an embodiment of the subtractor for μ-law signals. In FIG. 21, it should be noted that the circuit has no means corresponding to the OR-gates 292 and 302 in FIG. 20 according to said exception (b), and that the adder 502 for adding the bias value is inserted at the output of the subtractor 372.

It should be appreciated that the table memories 50 and 51 in FIG. 3 do not operate at the same time, therefore, those table memories can be replaced by a single adder/subtractor.

FIG. 22 is the modification of FIG. 20, and FIG. 22 utilizes table memories for each calculators in FIG. 20. In FIG. 22, the memory 2802 corresponds to the subtractor 282 in FIG. 20, the memory 3502 and 3602 correspond to the shift registers 352 and 362 respectively, the memory 3702 corresponds to the subtractor 372, the memory 3902 corresponds to the subtractor 392, and the memory 4002 corresponds to the shift register 402. In FIG. 22, the segment numbers each having three bits of the input PCM signals are applied to the memory 2802 as the address information of that memory. The outputs of the memory 2802 are a little different from that of the subtractor 282, and are the difference between two segment numbers including sign bits to be applied to the table memories 3502 and 3602, and the segment number which is not less than the other to be applied to the table memory 3902. On the other hands, the step numbers within segments of input PCM signals together with the outputs of the OR-gates 292 and 302, and segment number difference provided by the memory 2802 are applied to the memories 3502 and 3602 as the address information fo those memories. The memories 3502 and 3602 provide the step numbers within segments after the figure coincidence, as in the case of the shift registers 352 and 362 in FIG. 20. The outputs of the memories 3502 and 3602 are applied to the memory 3702 as the address information of the latter, and said memory 3702 performs the subtraction. The outputs of the memory 3702 are the sign bit to be applied to the gate 412, and the output of the logic circuit 382. Thus, the memory 3702 functions both the subtractor 372 and the logic circuit 382. The result $|P|-|Q|$ of the subtraction is obtained at the output of the memory 3902 (segment number), and the output of the memory 4002 (step number within segment).

As described above in detail, the present invention performs the calculation of non-linear PCM signals without converting the PCM signals to linear signals, and the apparatus is implemented either by a table memory, and/or simple circuits. Since the present circuit has no feed-back loop, the so-called pipeline process is available, and each memory and/or logic element are used in a multiplex operation mode, then, the high speed operation is obtained. Further, all the circuit components of the present apparatus can be mounted on a single LSI circuit.

From the foregoing, it will now be apparent that a new and improved PCM signal calculator has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A PCM signal calculator for addition of two input PCM signals P and Q each having a sign bit and a plurality of absolute value bits encoded to non-linear encoding system selected from A-law encoding system and μ-law encoding system with segment number and step number within segment comprising:

(a) a pair of input terminals for receiving two input PCM signals P and Q, each including a predetermined sign bit;

(b) first calculation means coupled to said input terminals responsive to PCM signals for providing an output equivalent to the sum of the absolute values of said two input PCM signals;

(c) second calculation means coupled to said input terminals responsive to PCM signals for providing an output equivalent to the difference between the absolute values of said two input PCM signals;

(d) an OR-gate coupled to and receiving the outputs of said means (b) and (c);

(e) means for applying the output of said first calculation means (b) to said OR-gate when the said sign bits of said two input PCM signals P and Q are the same as each other, and the output of said second calculation means (c) to said OR-gate when the said sign bits of said two input PCM signals P and Q are different from each other;

(f) a combination logic circuit for providing the sign bit of the sum of said two input PCM signals P and Q by providing the sign bit of either one of said two input PCM signals when the said sign bits of said input PCM signals P and Q are the same as each other, and by providing the combination logic result of the said sign bits of said two input PCM signals and said sign bit included in the output of said second calculation means (c) when the said sign bits of said input PCM signals P and Q are different from each other; and (g) output terminal for providing the absolute value from the output of said OR-gate, and the sign bit from the output of said combination logic circuit.

2. A PCM signal calculator according to claim 1, wherein said first calculation means (b) and said second calculation means (c) are table memories each storing the related calculated result at the address of said memory table indicated by the said two input signals.

3. A PCM signal calculator according to claim 1, wherein said first calculation means (b) for providing said sum comprises means for separating said input PCM signals into segment numbers and step numbers within said segments; shifting means for shifting step number bits of one of said input PCM signals by the number of bits that is equal to the difference between segment numbers of said input PCM signals; first addition means for providing the sum of two of said step numbers one of which having been shifted by said shifting means; second addition means for adding a carry bit of said first addition means to the segment number which is not less than the other segment number; and said first addition means providing the step number within segment of the sum and said second addition means providing the segment number of the sum.

4. A PCM signal calculator according to claim 3, wherein said first addition means comprises a table memory.

5. A PCM signal calculator according to claim 1, wherein said second calculation means for providing the difference comprises means for separating said two input PCM signals into segment numbers and step numbers within said segments; shifting means for shifting step number bits of one of said input PCM signals by the number of bits equal to the difference between said segment numbers of said two input PCM signals; first subtraction means for providing the difference between the said two step numbers, one of which having been shifted by said shifting means; second subtraction means for subtracting the number of first consecutive zero significant bits from the most significant bit position in the output of said first subtraction means from the segment number which is not less than the other segment number; said first subtraction means providing the step number within segment of the difference and said second subtraction means providing the segment number of the difference.

6. A PCM signal calculator for multiplication of two input PCM signals P and Q each having a sign bit and a plurality of absolute value bits encoded to non-linear encodying system selected from A-law encoding system and $\mu$-law encoding system with segment number and step number within segment comprising:

(a) a pair of input terminals for receiving two input PCM signals;

(b) means for separating said input PCM signals into segment numbers and step numbers within said segment numbers;

(c) addition means for providing addition of said segment numbers of said two input PCM signals;

(d) multiplication means for providing multiplication of said step numbers within said segments of said two input PCM signals;

(e) combination logic circuit for providing the segment number and the step number within the latter of said segment of the product of said two input PCM signals the outputs of said addition means (c) and said multiplication means (d);

(f) means for providing the sign bit of the product of said two input PCM signals from the said sign bits of the said input PCM signals; and (g) output terminal means for providing the absolute value and the sign bit of the calculation obtained through said means (c) through (f).

7. A PCM signal calculator according to claim 6, additionally including means for converting said input PCM signals at said input terminals (a) to other PCM signals encoded through another law, and means for re-converting an output at said output terminal (g) to a PCM signal encoded through the original law.

8. A PCM signal calculator according to claim 6, wherein said addition means (c), said multiplication means (d) and said combination logic circuit (e) are implemented by table memories storing the result of each calculation.

* * * * *